(12) United States Patent
Siddeq et al.

(10) Patent No.: US 10,432,971 B2
(45) Date of Patent: Oct. 1, 2019

(54) IMAGE DATA COMPRESSION AND DECOMPRESSION USING MINIMIZE SIZE MATRIX ALGORITHM

(71) Applicant: Sheffield Hallam University, Sheffield (GB)

(72) Inventors: Mohammed Siddeq, Sheffield (GB); Marcos Rodrigues, Sheffield (GB)

(73) Assignee: Sheffield Hallam University, Yorkshire (GB)

(*) Notice: Subject to any disclaimer, the term of this patent is extended or adjusted under 35 U.S.C. 154(b) by 13 days.

(21) Appl. No.: 15/553,503

(22) PCT Filed: Feb. 26, 2016

(86) PCT No.: PCT/GB2016/050512
§ 371 (c)(1),
(2) Date: Aug. 24, 2017

(87) PCT Pub. No.: WO2016/135510
PCT Pub. Date: Sep. 1, 2016

(65) Prior Publication Data
US 2018/0242020 A1    Aug. 23, 2018

(30) Foreign Application Priority Data
Feb. 27, 2015 (GB) .................................. 1503433.3

(51) Int. Cl.
*H04N 19/18*    (2014.01)
*H04N 19/625*    (2014.01)
(Continued)

(52) U.S. Cl.
CPC ......... *H04N 19/625* (2014.11); *H04N 19/126* (2014.11); *H04N 19/18* (2014.11); *H04N 19/182* (2014.11); *H04N 19/48* (2014.11)

(58) Field of Classification Search
USPC ....................................................... 375/240.2
See application file for complete search history.

(56) References Cited

U.S. PATENT DOCUMENTS 5,162,908 A    11/1992  Kim
7,616,829 B1 * 11/2009  Bilbrey .................. H04N 19/86
                                                       348/610
(Continued)

OTHER PUBLICATIONS

International Search Report and Written Opinion, dated May 25, 2016, in PCT/GB2016/050512, Filed Feb. 26, 2016.
(Continued)

*Primary Examiner* — Behrooz M Senfi
(74) *Attorney, Agent, or Firm* — Dunlap Codding, P.C.

(57) ABSTRACT

Computer implemented methods of compressing and decompressing image data are described. A discrete cosine (DCT) transformation is applied to each of a plurality of pixel blocks to generate a set of DCT coefficients for each pixel block comprising a DC DCT coefficient and a plurality of AC DCT coefficient. Each set of DCT coefficients is quantized. A DC array is formed from the set of quantized DC OCT coefficients and an AC matrix is formed from the set of quantized AC DCT coefficients. The AC matrix is compressed by eliminating blocks of data having only zero values and forming a reduced AC array from blocks including non-zero values. The reduced AC array is compressed using a key to form a coded AC array. The DC array and coded AC array are arithmetically coded to form arithmetically coded data which is included in a compressed image file. The decompression method is essentially the reverse process.

24 Claims, 13 Drawing Sheets

(51) Int. Cl.
H04N 19/48 (2014.01)
H04N 19/126 (2014.01)
H04N 19/182 (2014.01)

(56) References Cited

U.S. PATENT DOCUMENTS

| | | |
|---|---|---|
| 2002/0076115 A1 | 6/2002 | Leeder et al. |
| 2004/0126021 A1* | 7/2004 | Sull ................ G11B 27/034 382/233 |
| 2007/0019875 A1 | 1/2007 | Sung et al. |
| 2007/0086663 A1* | 4/2007 | Lee ................ H04N 19/60 382/238 |

OTHER PUBLICATIONS

Siddeq, Using Two Levels DWT with Limited Sequential Search Algorithm for Image Compression, Journal of Signal and Information Processing, vol. 03, No. 01, Jan. 1, 2012, pp. 51-62.

Siddeq, Applied two Stages Minimize-Matrix-Size Algorithm with DCT on DWT for Image Compression, UK Journal of Information and Computing Science, Jan. 1, 2012, pp. 37-53.

Siddeq, A Novel 2D Image Compression Algorithm Based on Two Levels DWT and DCT Transforms with Enhanced Minimize-Matrix-Size Algorithm for High Resolution Structured Light 3D Surface Reconstruction, 3D Research, 3D Display Research Center, Sequl, vol. 6, No. 3, Jul. 7, 2017, pp. 1-35.

United Kingdom Intellectual Property Office Combined Search and Examination Report regarding United Kingdom Application No. GB1503433.3, dated Aug. 5, 2016.

* cited by examiner

600

602

604

IMAGE DATA COMPRESSION AND DECOMPRESSION USING MINIMIZE SIZE MATRIX ALGORITHM

The present invention relates to data compression and in particular to data processing methods and data processing apparatus for compressing and/or decompressing image data, including still image data and video image data.

Various data compression methods are known and are particularly useful for large data files such as image data files. Image data compression has become more important in multimedia applications. While the cost of data storage has decreased, the amount of image data and video data generated and requiring storage has increased greatly, as is particularly evident for large data repositories such as YouTube and cloud storage services. With the increasing growth of network traffic and storage requirements, more efficient methods for compressing still image data and video image data, while retaining high reconstructed image quality would be beneficial particularly with a reduction in the size of the compressed data.

The discrete cosine transform (DCT) has been extensively used in image compression. The image is divided into segments and each segment is then subject to the discrete cosine transformation, which creates a series of frequency components that correspond to different levels of detail of the image. Several forms of coding may then be applied in order to store only DCT coefficients that are found to be significant. This general approach is used in the JPEG file format for still images, and many video compression methods and multi-media applications are generally based on it.

However, JPEG compression using DCT is lossy and often introduces compression artefacts into the image data which are visible in the image generated form the decompressed image data. Also, when applied to large image files, the resulting compressed image file may still be quite large. For example, the JPEG algorithm can compress a 9 Mbyte image into a minimum of 50 KB, and not less than that, and with noticeable degradation in the decompressed image.

A step beyond JPEG is JPEG2000 that is based on the discrete wavelet transform (DWT) which is a mathematical toll for hierarchically decomposing functions. Image compression using Wavelet Transforms are a powerful method that may be preferred in order to compress images at higher compression ratios with higher peak signal-to-noise ration (PSNR) values, its superiority to JPEG in achieving high compression ratio, error resilience, and other features has led to the JPEG2000 ISO. The JPEG2000 codec is more efficient than its predecessor, JPEG, and overcomes many of JPEG's drawbacks. JPEG 2000 also offers higher flexibility compared to many other codecs such as region of interest, high dynamic range of intensity values, multi component, lossy and lossless compression, efficient computation, and compression rate control.

The robustness of JPEG2000 stems from its utilization of DWT for encoding image data. DWT exhibits high effectiveness in image compression due to its support of multi-resolution representation in both the spatial and frequency domains. In addition, DWT can also support progressive image transmission and region of interest coding.

Although on its own JPEG2000 is a better image data compression technique than JPEG, video compression is often done using JPEG as JPEG2000 tends to give rise to image blur when applied to video and so tends to be avoided. JPEG does not gives rise to image blur in video and hence is often preferred.

Furthermore, in some applications it can be desirable to be able to compress 3D image data. While geometry and connectivity of a 3D mesh can be tackled by a number of techniques, such as high degree polynomial interpolation or partial differential equations, the issue of efficient compression of 2D images both for 3D reconstruction and texture mapping for structural light 3D applications, has not been addressed.

Moreover, in many applications, it may be desirable to transmit 3D models over a communications network, such as the Internet, for example to share CAD/-CAM models, to update content for entertainment applications, or to support collaborative design, analysis, and display of engineering, medical, and scientific datasets. However, bandwidth imposes hard limits on the amount of data transmission and, together with storage costs, limit the complexity of the 3D models that can be transmitted over the Internet and other networked environments.

Therefore there is a need for image data compression techniques which do not introduce significant compression artefacts and/or produces small sized compressed image data files. It would be particular beneficial if the same technique were applicable to both still and video image data and also were suited to 3D image data.

The present invention provides a method for image compression based on DCT, but using a quantization process which creates two matrices of data. A one of these matrices is then shrunk using a matrix size minimization algorithm. This method achieves an efficient image compression ratio and superior accuracy of 2D and 3D image reconstruction, compared with standard JPEG and JPEG2000, while also being suitable for both still and video image compression.

A first aspect of the invention provides a computer implemented method of compressing image data. A discrete cosine (DCT) transformation is applied to each of a plurality of non-overlapping pixel blocks which span a frame of image data to generate a set of DCT coefficients for each pixel block comprising a DC DCT coefficient and a plurality of AC DCT coefficients. All of the sets of DCT coefficients may be quantised to generate a set of quantised DC DCT coefficients and a set of quantised DC DCT coefficients. The AC matrix may be compressed by eliminating blocks of data of the AC matrix having only zero values and forming a reduced AC array from blocks of data of the AC matrix including non-zero values. The reduced AC array may be compressed using a key to form a coded AC array. The Dc array and the coded AC array may be arithmetically coded to form arithmetically coded data. A compressed image file may be formed including the arithmetically coded data.

By separating out the data which represents the more important features of the image (the DC DCT coefficients) and the data which represents the less important features of the image (the AC DCT coefficients), and processing them separately, a high compression ratio can be achieved while still avoiding noticeable image compression artefacts in the decompressed image.

Quantising all of the sets DCT coefficients may include applying a quantisation factor which results in at least a quarter, at least a half or about three quarters of the DCT coefficient have a value of less than 1 and preferably approximately zero. Applying the quantisation factor may involve dividing the DCT coefficients of each set of DCT coefficient by a quantisation factor which is greater than at least two. The value of the quantisation factor can depend on the size of the pixel block.

The method may further comprise compressing the DC array to form a compressed DC array, in which case the compressed DC array is subsequently arithmetically coded to form the arithmetically coded data.

Compressing the DC array may include applying a process to make the values of the elements of the compressed DC array more similar and or appear in the compressed DC array with a higher frequency, compared to the elements of the DC array. Compressing the DC array may include calculating a difference between values of the elements of the DC array to form the compressed DC array.

The method may further comprise generating the key using the maximum value of the elements of the reduced AC array.

The key may comprise a plurality of key components. Each key component may have a different value. The same number of elements of the reduced AC array as the number of key components may be combined using the key to form a single element of the coded AC array. The key may comprise three key components, or a greater or lesser number of key components. A greater number of components may slow down the decompression process. There is therefore a balance between increasing the compression efficiency by using a greater number of key components and not slowing down the decompression process. The number of key components may be in the range of from three to eight.

Compressing the reduced AC array may further comprise forming a first coded AC array including the non-zero elements of the coded AC array and forming a second coded AC array including data which encodes the zero elements of the coded AC array. The data which encodes the zero elements of the coded array may include data indicating the number of zeros between adjacent non-zero elements and/or data indicating the position of non-zero elements. The second coded AC array may be further encoded to increase the frequency of occurrence of values of elements of a third coded AC array.

The method may further comprise forming a limited data array comprising elements having values corresponding only to each unique value of the elements of the AC matrix. Forming the limited data array may also include determining the frequency of occurrence of each unique vale in the AC matrix.

Forming the compressed image file may include storing the key and/or the limited data. The key and/or limited data may be sorted separately and associated with the compressed image file. The key and/or limited data may be stored in the compressed image file, for example in a header of the compressed image file.

Header data can be separated from the compressed data to effective create a cryptographic version of the compressed data. A decompression algorithm method would be unable to decompress the data without the key values used to compress the data.

Each of the plurality of non-overlapping pixel blocks may have a size of n×n. The value of n may be at least 4 and preferably at least 8. The value of n may be selected from 4, 8, 16, 32, 64, 128, 256. The value of n may be in the range of from 4 to 256.

The image may be a colour image and may include a plurality of colour components. The method may be applied for each of the colour components. The colour components may be RGB or YCrCb or HSV or any other generally known colour space.

The method may further comprise storing the compressed image file locally on a first data processing device and/or transmitting the compressed image file to a communications network for storage on a remote second data processing device. The method may further include generating the image data on the first data processing device. The image data may correspond to a photograph, video, graphic or 3D model generated using the first data processing device. The image data maybe generated by an image capturing device such as a camera or scanner.

A second aspect of the invention provides a computer implemented method of decompressing image data. A compressed image file including arithmetically coded data is opened. The arithmetically coded data is arithmetically decoded to form a DC array and a coded AC array. The elements of the DC array may correspond to a set of quantised DC DCT coefficients. The coded AC array may be decompressed using a key to form a reduced AC array. An AC matrix may be rebuilt by forming blocks of data in the AC matrix including non-zero values and obtained from the reduced AC array and forming the rest of the AC matrix with blocks of data having only zero values. The elements of the AC matrix may be a set of quantised AC DCT coefficients. An inverse quantisation may be applied to the set of quantised DC DCT coefficients and the set of quantised AC DCT coefficients to generate a plurality of sets of DCT coefficients each corresponding to a respective one of a plurality of pixel blocks. Each set of DCT coefficients may comprise a DC DCT coefficient and a plurality of SC DCT coefficients. An inverse DCT transformation may be applied to each of the plurality of sets of DCT coefficients to form a plurality of non-overlapping pixel blocks which span a frame of image data.

The method may further comprise decompressing the DC array to form a further DC array in which the elements are the set of quantised DC DCT coefficients. Decompressing the DC array may include calculating a total between values of the elements of the DC array and storing the results in the further DC array.

Decompressing the coded AC array may include retrieving a limited data array comprising elements having values corresponding only to each unique value of the elements of an original AC matrix. The values of all possible combinations of the elements of the limited data array when combined with the key may be calculated and may be stored them in a limited data-key combinations array. A searching method may be applied to the limited data-key combinations array using the values of the elements of the coded AC array to find matching values. The combination of elements of the limited array corresponding to each matching value may be determined. The reduced AC array may be formed from each determined combination of elements of the limited array.

The method may further comprise sorting the limited data-key combinations array by size order to form a sorted limited data-key combinations array. The sorting my be by ascending size or descending size.

The search method may be a parallel search method.

The search method may implement a binary search algorithm.

The key may comprise a plurality of key components. The key may compose three or at least three key components. Each key component may have a different size.

The compressed image file may include the key and/or a limited data array and they may be in a header of the compressed image file.

The key and/or limited data array may be associated with the compressed image file and stored separately from the arithmetically coded data.

Each of the plurality of non-overlapping pixel blocks may have a size of n×n and n may be at least 8. The value of n may be selected from 8, 16, 32, 64, 128, 256.

The method may further comprise retrieving the compressed image file from local storage on a second data processing device and/or receiving the compressed image file over a communications network from a remote first data processing device.

The frame of image data may be a 2D image.

The frame of image data may be a 3D image. The compressed image file may have ancillary data associated with it stored in it and which enables or allows reconstruction and/or display of the 3D image.

The frame of image data may be a still or static image or a part of a videos or an animation.

A third aspect of the invention provides a computer implemented method of handling image data, comprising: generating at least one frame of image data; compressing the frame of image data using the method of the first aspect of the invention, and any preferred features thereof, to form a compressed image file; decompressing the compressed image file using the method of the second aspect of the invention, and preferred features thereof, to form the at least one frame of image data; and displaying the at least one frame of image data on a display device or otherwise outputting the at least one frame of image data.

The method may further comprising transmitting the compressed image file from a first data processing device to a second data processing device before decompressing the compressed image file. The image file may be transmitted over a wide area network or a local area network.

The compressed image file may be decompressed and displayed, or otherwise output, by the second data processing device.

The method may further comprise storing the compressed image file on the second data processing device. The method may further comprise transmitting the compressed image file from the second data processing device to a third data processing device before decompressing the compressed image file. The compressed image file may be decompressed and/or displayed, or otherwise output, by the third data processing device. The second data processing device may serve as an image data server, such as a photograph or video file server. The first and/or third data processing devices may each be client devices.

A fourth aspect of the invention provides a computer readable medium storing computer executable instructions which configure a data processing device to carry out the method of the first and/or second aspects of the invention and any preferred features of either of those.

A fifth aspect of the invention provides a data processing device comprising at least one data processor and the computer readable medium of the fourth aspect of the invention.

A sixth aspect of the invention provides a first computer readable medium storing computer executable instructions which configure a first data proceeding device to carry out the method of the first aspect of the invention and a second computer readable medium storing computer executable instructions which configure a second data processing device to carry out the method of the second aspect of the invention.

A seventh aspect of the invention provides a system comprising: a first data processing device comprising at least one data processor and the first computer readable medium of the sixth aspect of the invention; a second data processing device comprising at least one data processor and the second computer readable medium of the sixth aspect of the invention; and a communications network in communication with the first data processing device and the second data processing device.

An embodiment of the invention will now be described in detail, by way of example only, and with reference to the accompanying drawing, in which.

Similar items in the different Figures share common reference signs unless indicated otherwise.

Figure 1:
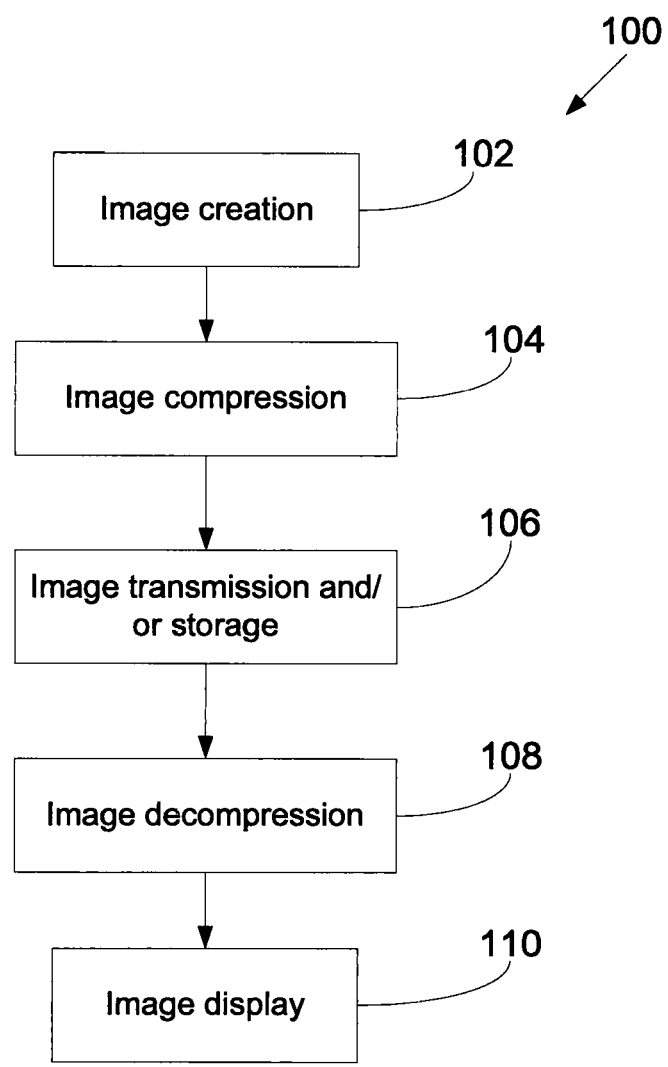
FIG. 1 shows a process flow chart illustrating a general image processing method according to the invention and including image compression and decompression steps each according to the invention.

FIG. 1 shows a flow chart illustrating a general image data processing method 100 according to the invention and in which the image compression method and image decompression method aspects of the invention can be used. As discussed in greater detail below, the image compression and decompression methods of the invention are applicable to any type of image data which can be represented by pixel colour or greyscale components. In particular, the invention is applicable to 2D images both still and video. Further, the invention can be applied to 3D images. In that case, some ancillary data may be used in addition to the compressed image data in order to reconstruct the 3D image when decompressing the image field.

However, the creation of 3D image data and reconstruction thereof is generally known in the art and is described, for example, in Jason Geng, Structured-light 3D surface imaging: a tutorial, Advances in Optics and Photonics, Vol 3, Issue 2, pp 128-160, 2001; MAIER-HEIN, L., MOUNTNEY, P., BARTOLI, A., ELHAWARY, H., ELSON, D., GROCH, A., KOLB, A., RODRIGUES, Marcos, SORGER, J., SPEIDEL, Suzanne and STOYANOV, D. (2013), Optical techniques for 3D surface reconstruction in computer-assisted laparoscopic surgery, *Medical Image Analysis*, 17(8), 974-996; RODRIGUES, Marcos, KORMANN, Mariza, SCHUHLER, C and TOMEK, P (2013), Structured light techniques for 3D surface reconstruction in robotic tasks, in KACPRZYK, J, (ed.) *Advances in Intelligent Systems and Computing*, Heidelberg, Springer, 805-814; RODRIGUES, Marcos (2012) Fast 3D reconstruction with single shot technology: engineering and computing challenges, in *First national Conference on Technology and Management*, Malabe, Sri Lanka, 27 Jan. 2012, Malabe, Sri Lanka, Sri Lanka Institute of Information Technology; and RODRIGUES, Marcos, OSMAN, Abdusslam and ROBINSON, Alan (2013), Partial differential equations for 3D Data compression and Reconstruction, *ADSA Advances in Dynamical Systems and Applications*, 8 (2), 303-315.

The image data processing method 100 generally starts from the image creation step 102 at which image data is created. In some embodiments, this may be by using a steel or video cameral to capture image data. In other embodiments, the image data may arise from scanning a real world item. Alternatively, in other embodiments, the image creation may be a modelling process, for example using a CAD system, or using a drawing or similar application to create the image data. Irrespective of how the image data is created at step 102, at step 104, the image data is compressed using the image compression method aspect of the invention as described in greater detail below. After the image data has been compressed, then the image data may be stored locally or transmitted and stored remotely. For example, in some embodiments, the image processing method 100 may all operate on, for example, a smartphone so as to increase the number of images which can be stored locally on the smartphone from a built in camera. In other embodiments, the compressed image data may be transmitted to a remote site for storage. For example, the image data may be photo sharing website or a cloud storage device for remote storage. In yet further embodiments, the image data may be transmitted to a further data processing device for display and review. For example, if the image comprises x-ray image data, then the remote device may be a digital x-ray viewing device and the compressed image data may be sent over network. Obviously, the compressed image data can be sent both to a repository for storage, and also to a viewing device.

When it is desired to view the image data, then at step 108, the image decompression method of the invention is applied to the stored image data. The format of the file which is sorted and/or transmitted at step 106 is described in greater detail below with reference to FIG. 10.

After the image has been decompressed at 108, then the image can be displayed at step 110. For example, this may comprise simply recalling a locally stored photograph from memory on a smartphone and displaying it to a user. In other embodiments, it may comprise displaying a locally or remotely generated model on a CAD and/or CAM system. In other embodiments, it may comprise displaying an x-ray image to a medical practitioner. In yet further embodiments, it may comprise displaying a 3D image, using the associated 3D image reconstruction data, to a user. In other embodiments, it may comprise displaying a video to a user in which the image data is streamed from a remote source decompressed at 108 and displayed at 110 in a video player.

It will be apparent that the invention is therefore applicable in a wide range of fields and in particular during 2D, 3D and video image data. As discussed below, the compression and decompression methods of the invention provide efficient image compression ratios and decompression without introducing significant image artefacts. Also, it is suitable for both still images and video. Hence, the invention has wide range of applicability and numerous benefits as discussed in further detail below. For example, the invention may be applied to video compression and streaming applications. Other applications relate to surface reconstruction using optical techniques using either structured white light or near infrared. This approach can be applied to applications such as security, multimedia graphics and animation, geometrical descriptions of 3D modelling software, verification of shape geometry in industrial processes, medical prosthetics and rehabilitation, reverse engineering and archiving and many more.

Figure 2:
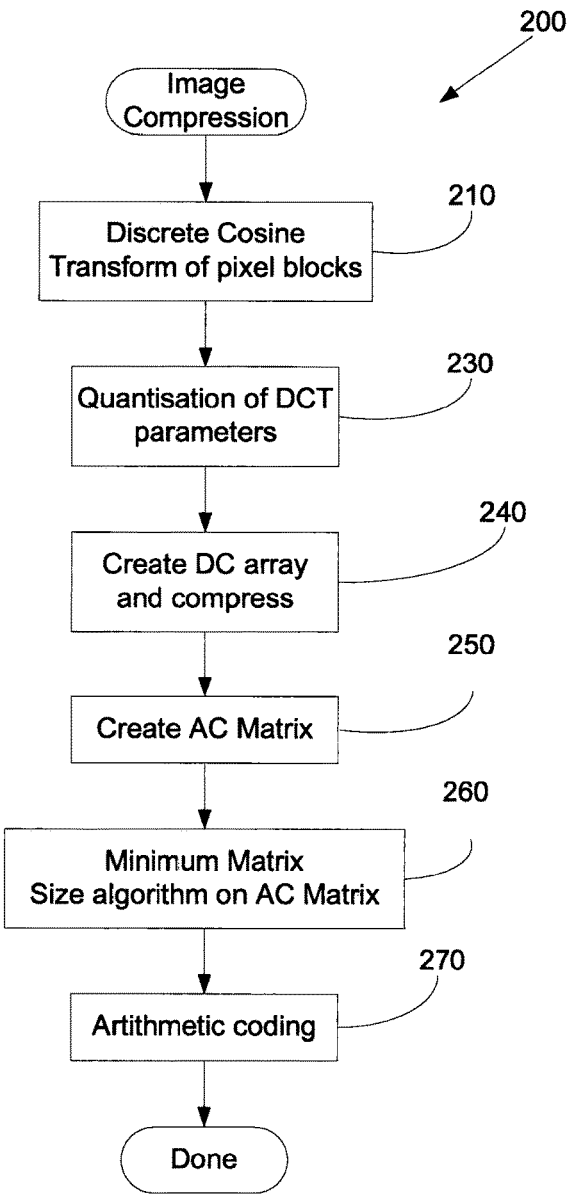
FIG. 2 shows a process flow chart illustrating an image compression method according to the invention and corresponding to the image compression step of FIG. 1.
Figure 3:
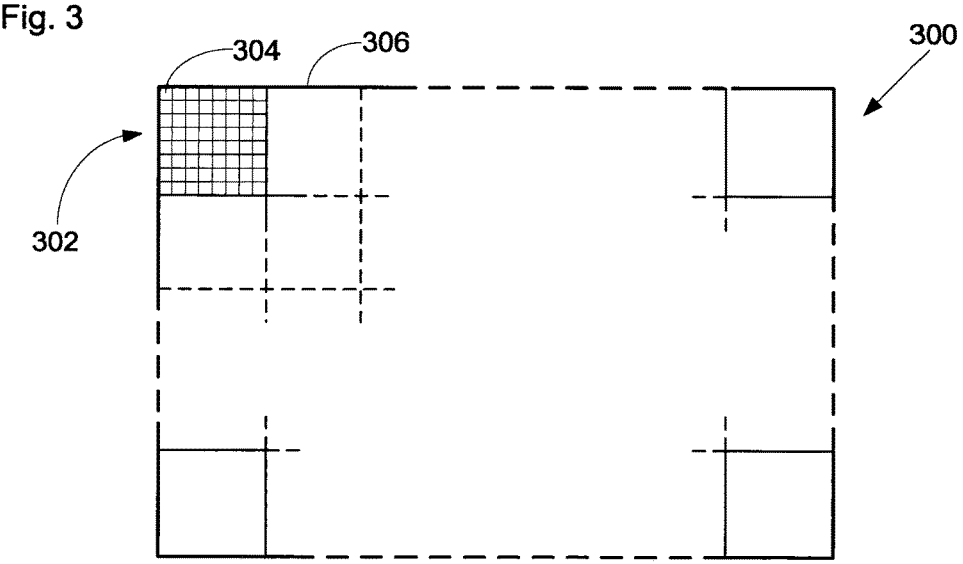
FIG. 3 shows a graphical representation of an image comprising an array of pixels represented by image data.

FIG. 2 shows a process flow chart illustrating an image compression method 200 according to the invention and corresponding generally to step 104 of FIG. 1. Initially, at step 202 the discrete cosine transformation (DCT) is applied to the original image. FIG. 3 illustrates a graphical representation of an image 300 in the form of a rectangular array of individual pixels, for example an array of 1280×1080 pixels. For a grey scale image each pixel is presented by a single grey scale data item of intensity, for example in the range of from 0 (corresponding to black) through to 255 (corresponding to white). For a colour image, each pixel is represented by three colour data items, which will depend on the colour space used to represent by three colour data items, which will depend on the colour space used to represent the colour image. Common colour spaces include RGB, YCrCb and HSV although other are generally known. In the following example, an RGB colour space is assumed but the invention is not limited to that specific colour space. FIG. 3 illustrated a single colour component and hence, for a colour image and an RGB colour space, the colour image is separated into its three colour channels, red, green and blue and the colour data for each colour channel is processed separately.

Firstly, for each colour channel, the 2D image 300 is divided into non-overlapping blocks, e.g. 302, of n×n pixels, e.g. pixel 304. In the illustrated example, block 302 comprises 8×8 pixels and a feature of the invention is that it used large blocks of pixels, compared to JPEG which typically uses smaller pixel blocks, e.g. 2×2, for its DCT step. Indeed the invention may generally use blocks of pixels with n≥4, e.g. n=4, 8, 16, 32, 64, etc. Hence, in the current example, image 300 is broken into 160×135 blocks 302 each of 8×8 pixels. At 210, each pixel block, 302, is transformed by applying the DCT to produce de-correlated DCT coefficients. The transformation produces the same number of DCT coefficients as pixels in the block, in his example 64.

In the case that the image size is not an integer multiple of the pixel block size, then the boundaries of the image are padded with zeros. For example, for an image size of 1024×1024, and if the image is divided using 16×16 pixel blocks, the pixel blocks do not cross the image boundaries. However, for an image size of 1030×1020, and 16×16 pixel blocks, in this case the method pads zeros around the image so as to correspond to an integer multiple of pixel blocks, in this example 65×65.

Figure fours provides a graphical representation 310 of the 64 DCT coefficients produced by applying the DCT. When transformed into the frequency domain, each pixel block consist of a DC coefficient value at the first location 312, and other AC coefficient values 314, 316 (which are typically much smaller than the DC coefficient 312), as described in equation (1)

$$C(u, v) = a(u)a(v)\sum_{x=0}^{n-1}\sum_{y=0}^{n-1} f(x, y)\cos\left[\frac{(2x+1)u\pi}{2n}\right]\cos\left[\frac{(2y+1)v\pi}{2n}\right] \quad (1)$$

where $a(u) = \sqrt{\frac{1}{n}}$, for $u = 0$, $a(u) = \sqrt{\frac{2}{n}}$, for $u \neq 0$ and u and v denote the horizontal and vertical components respectively.

In the context of the DCT, DC corresponds to the mean value of a signal, and so the DC components or coefficients are related to the average brightness intensity of each block. In contrast to this, all other values correspond to superimposed variations in the signal and are hence denoted AC. Hence, DC and AC are used to refer to the mean or average value and variations respectively.

Then at step 230, the DCT coefficients for each block, e.g. block 310, are quantised. Each block 310 of n×n DCT co-efficients is quantized using a quantization table, which can be represented by the following equation (2).

$$Q(i,j) = \text{Factor} \cdot (i+j) \quad (2)$$

where i,j=1, 2, ... n, Factor=2, 3, ... etc.

Each n×n block 310 is quantized by using a "Q" using dot-division-matrix with truncates the results. This process 230 removes insignificant DCT coefficients and increases the number of the zeroes in each block 310. In the equation (2), the parameter "Factor" is used to increase or decrease the values of the "Q". Thus, image details are reduced when Factor >2. For the DC coefficient, i=1 and j=1 and hence, Q has its lowest value and therefore on division by Q, the DC co-efficient is reduced proportionally less than the AC coefficients. For example, for the last AC coefficient 318, i=9 and j=8, and hence Q has its greatest value. There is no particular limit on the range for Factor, because its value depends on the DCT coefficients or image resolution.

After quantisation of the DCT coefficients, an array 320 is formed of the quantised DC DCT coefficients. As illustrated by line 326 in FIG. 4, the first element 322 of array 320 is quantised DC DCT coefficient for the first pixel block. The second element 324 of array 320 is the quantised DC DCT coefficient for the second pixel block 306, etc. As in this example, there are 21,600 pixel blocks, quantised DC DCT coefficient array 320 has 21,600 elements. The DC DCT coefficient array 320 is then compressed at 240 to form a compressed DC array 330. In particular, the difference is computed between two adjacent values of array 320, e.g. 32 and 324, and the result stored as an element 332 in the compressed DC-array 330, as illustrated by arrow 334. This compression process is referred to as DBV or Difference Between two Values process. The quantised DC DCT coefficients in array 320 are correlated and generally their values are similar. Hence, their differences, i.e. the elements of compressed array 330, are small and much of the data in compressed array 330 will be repeated, which is easier to compress. Equation (3) describes this DBV process $$D(i) = D(i) - D(i+1)$$

where i=1, 2, 3, . . . , m−1 and m is the original DC array 320 size, which in this example is 21,600.

For example, applying (3) to the example DC array of {13, 13, 15, 14, 14, 13, 15, 16, 17, 13, 14, 14} results in a compressed DC array of [0, −1, 1, 0, 1, −2, −1, −1, 4, −1, 0, 14]. Hence, compressed array 320 has a higher frequency of repetition of its data and is therefore easier to compress.

Figure 4:
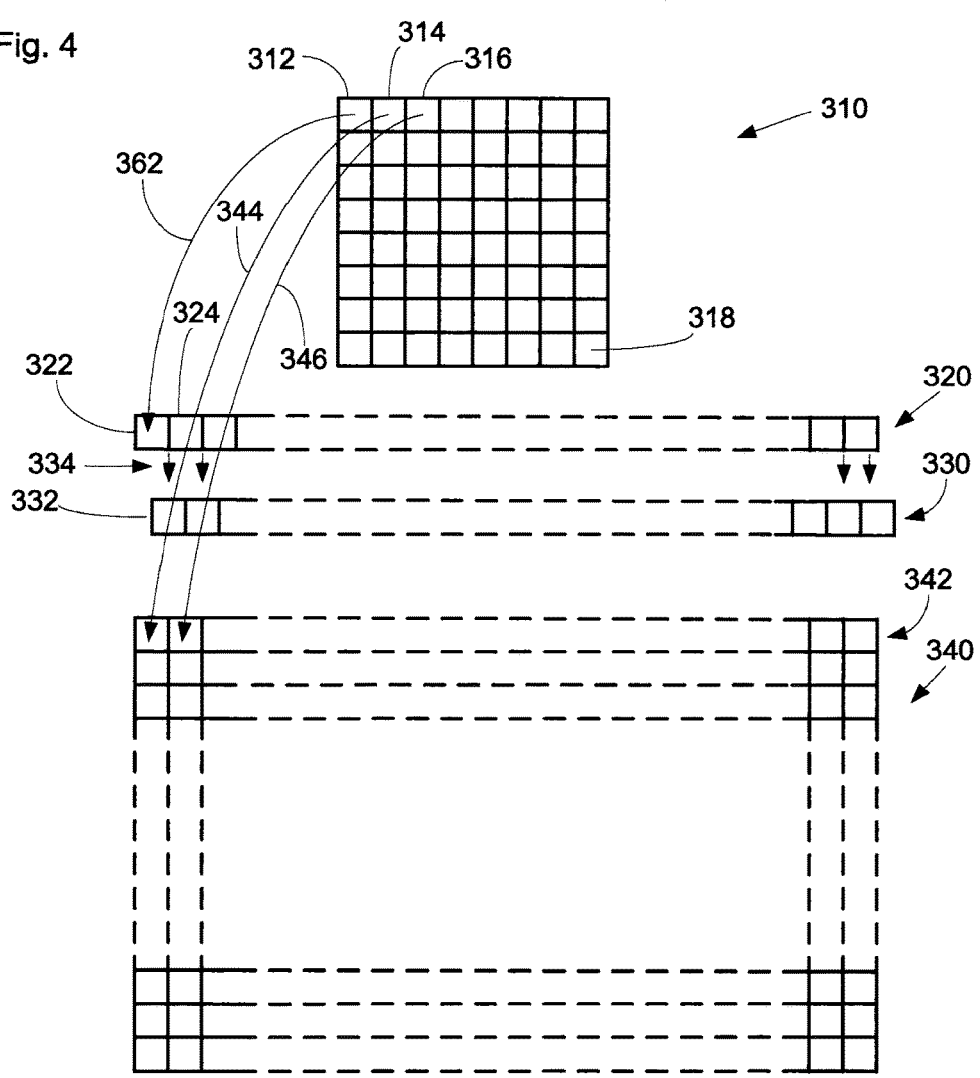
FIG. 4 shows a graphical representation of the result of applying the discrete cosine transformation to an n×n pixel block of the image data illustrated in FIG. 3 and the separation into an array of DC DCT coefficients and a matrix of SC DCT coefficients.

The remaining quantised AC DCT coefficients for the pixel block, e.g. 314, 316 and which in this example total 63 coefficients, are converted to a one dimensional array, as illustrated by lines 344 and 346 in FIG. 4, by scanning column-by-column, to form a row 342 of a matrix 340 referred to generally herein as the AC matrix. This process is repeated at 250 for each pixel block until the AC matrix is formed having 21,600 rows, each of 63 columns, and wherein each elements of the AC matrix corresponds to a quantised AC DCT coefficient.

At 260, a process is applied to the AC matrix 340 to reduce its size by removing data elements having a value of zero. The algorithm compresses the size of the AC matrix 260 and converts it into a one dimensional array and is generally referred to herein as the Minimize-Matrix-Size or MMS algorithm. The AC matrix 340 typically contains lots of data elements with value zero and a few data elements having a non-zero value. The MMS algorithm 260 generally eliminates blocks of zeros and stores blocks of nonzero data into an array. This algorithm both compresses the AC matrix 340 and also converts it into a one dimensional array which is susceptible to further compression using a further compression method referred to generally herein as the Eliminates Zeros and Store Nonzero data or EZSN algorithm.

Generally speaking the MMS algorithm partitions the AC matrix 340 into non-overlapping blocks of size K×K, where K≥8, and then starts to search for nonzero blocks of data, i.e. searches for at least one data element having a non-zero value inside a block. If a block contains a data element having a nonzero value, then all of the data elements in the block are stored in an array generally referred to herein as the reduced AC array. Otherwise, the block is ignored, and the algorithm continues to search for other nonzero blocks.

Figure 5:
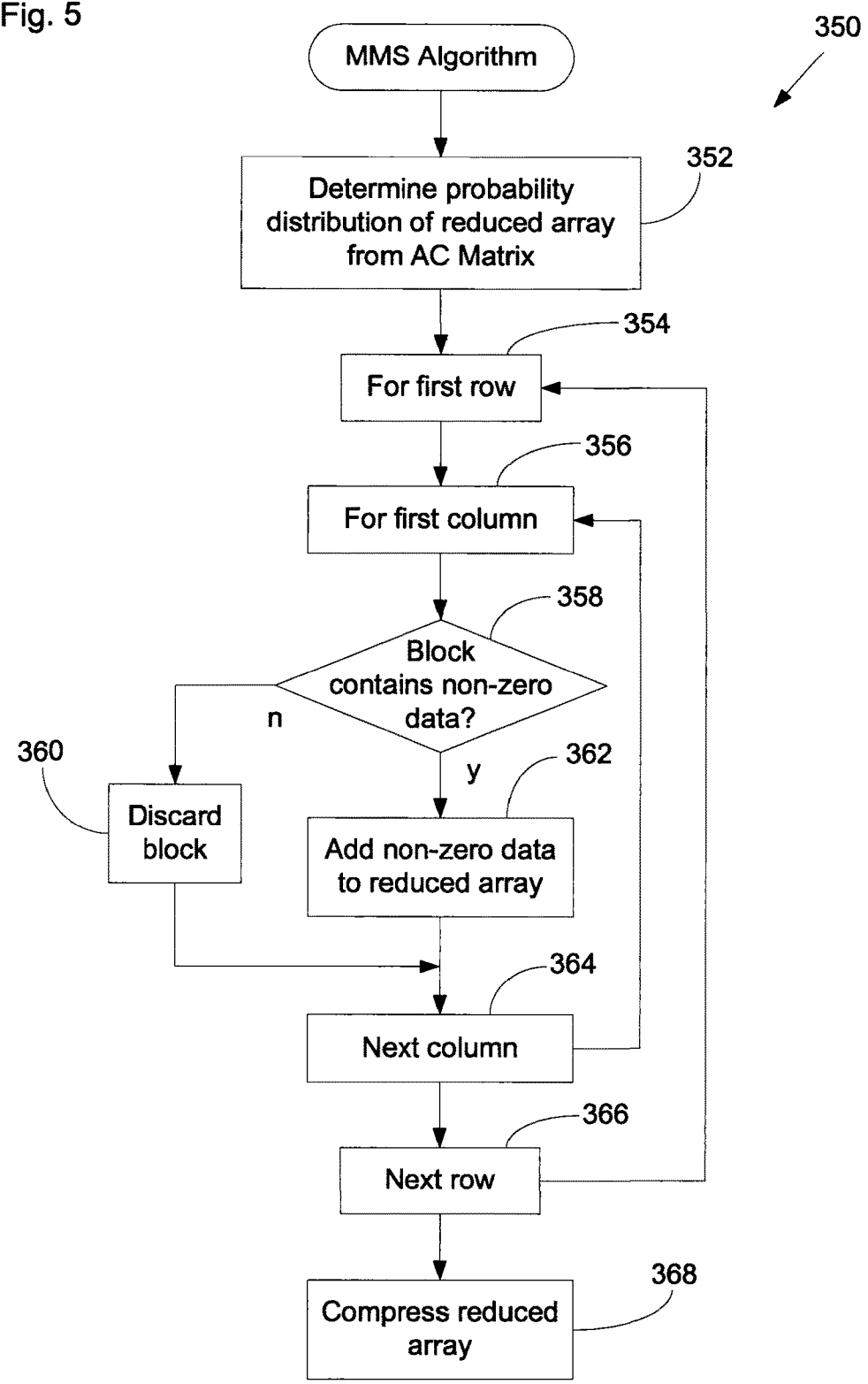
FIG. 5 shows a process flow chart illustrating an algorithm for compressing the matrix of SC DCT coefficients.
Figure 6:
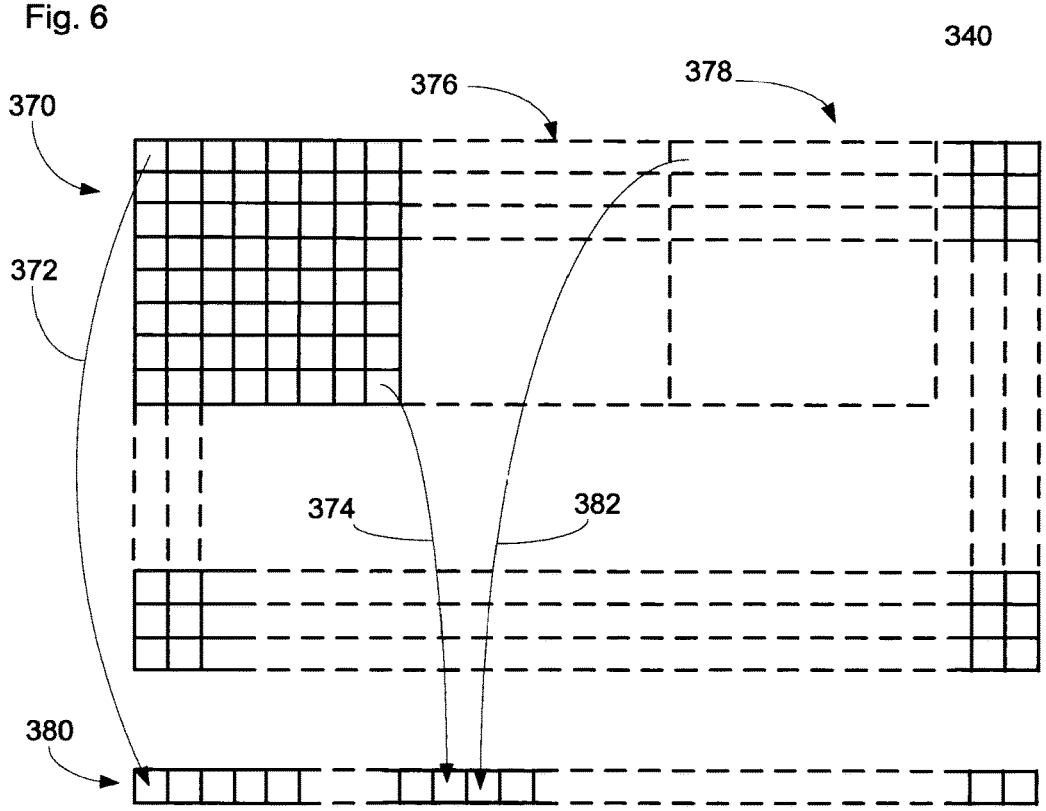
FIG. 6 shows a graphical representation illustrating the method of FIG. 5 of compressing the matrix of AC DCT coefficients into an array.

The MMS method 350 is illustrated by the process flow chart of FIG. 5 and graphically by FIG. 6. Before applying the Minimize-Matrix-Size method 350, the probability of the data elements of the reduced AC array is computed from the data elements of the AC matrix 340. Each unique data value is determined from all of the elements of the AC matrix 340 together with their frequency of occurrence from which the probability of any non-zero data element can be determined: e.g. the value −3 occurs 13568 times out of a total of 1360800 data elements in AC matrix 340.

For example, if the AC matrix had the following form:

$$\begin{bmatrix} -1 & 0 & 5 & 0 \\ 1 & 0 & 2 & 0 \\ 0 & 0 & 2 & 1 \\ -2 & 0 & 2 & -2 \end{bmatrix}$$

Then each unique data value is determined from all the elements of the matrix to create the limited data array [−1,0,5,1,2,−2] having frequency of occurrence or repetition of [1,7,1,2,3,2]. These data values are the associated probabilities are generally referred to herein as limited data and are used in the decompression stage. The values of the data I the limited array are not repeated as the limited data represents the space searched by the decompression method to reconstruct the original AC matrix and so values should not be repeated. The size of the limited data can be represented in bits, so the limited data is stored in a header portion of the compressed image file, as described in greater detail below. Its effect on the total compressed file size is almost negligible.

The first stage of the MMS method 350 generally eliminates blocks of data from the AC matrix 340 containing zero values only. The AC matrix 340 is partitioned into 8×8 blocks of data, e.g. first 8×8 data block 370. The first block 370 positional in a first row 354 and at a first column 356 position is evaluated at 358 to determine if any of its 64 data elements have a non-zero value. If it is determined that all of the data elements in the block do have zero value, then processing proceeds to 360 and the data block is discarded. Otherwise, at 362 all of the data in the current data block, even if most of its values are zero, is added in sequence, on a row by row basis, to a one dimensional data array 380, referred to generally herein as the reduced AC array. As illustrated in FIG. 6, the first data element of the first block 370 is stored 372 as the first element of the reduced AC array 380 and the last data element of the first block 370 is stored 374 as the 64$^{th}$ element of the reduces AC array 380.

At 364 a next data block in the current row is selected, in this example, data block 376 and processing proceeds as described above. In this example, all of the data elements of the second data block 376 have a value of zero and hence the second data block 376 is discarded at 360 and none of its data is stored in reduced AC array 380. Processing loops back to 354 and the third data block 378 is evaluated and determined at 358 to include some non-zero data and so all of its data elements are added 382 to the reduced AC array 380 at 362 and concatenated with the existing data. The process loops again for the next row of data blocks and so on until the entire AC array 340 has been evaluated and all zero data blocks have been eliminated.

In pseudo code the eliminate-zeros, store non-zeros part of the MMS method 350 can be represented as follows:

```
K=8; %% block size = [K x K]
  I=1; LOC=1
  While (I<column size for high-frequency sub-band)
    J=1;
    While (J<row size for high-frequency sub-band)
      Block[1..K*K]= Read_Block_from_Matrix(I, J) ;
      %% read a block 8×8
      from high-frequency sub-band
      IF( Check_Block(Block) =='nonzero') %% this
      function check the
      "Block" content = nonzero?
        POSTION [LOC] =I; POSTION [LOC+1] =J;
        %% Save location for
        block contains nonzero data
        LOC=LOC+2;
      For n=1: Block_Size* Block_Size
        Reduced_Array[P]= Block[n]; %% save nonzero data is new array
        ++P;
      End;
    End;
    J=J+ K;
  End;
  I=1+ K;
End;
```

After the AC Matrix 340 has had its zero data blocks eliminated and the remaining data transformed into the reduced AC array 380, the MMS method 350 compresses the reduced array at step 368 using a key and the results are stored in a new array referred to herein generally as the coded AC array. In the following example, the compression at step 368 is by a factor of ⅓, but the value will on the key values used and the values of the coefficients in the reduced AC array 380.

Figure 8:
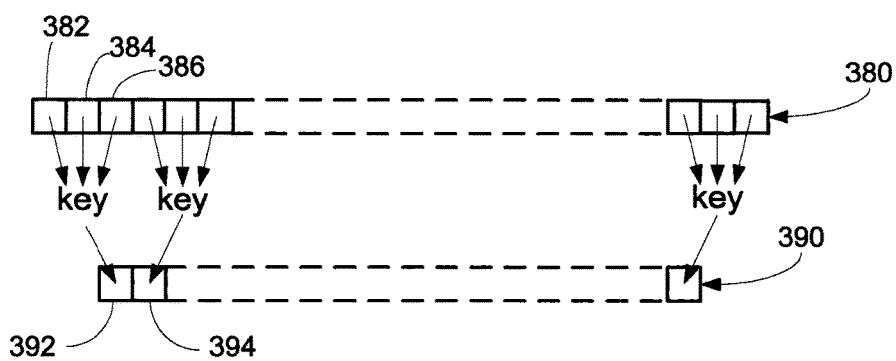
FIG. 8 shows a graphical representation illustrating a key based compression step of the method of FIG. 7.
Figure 9:
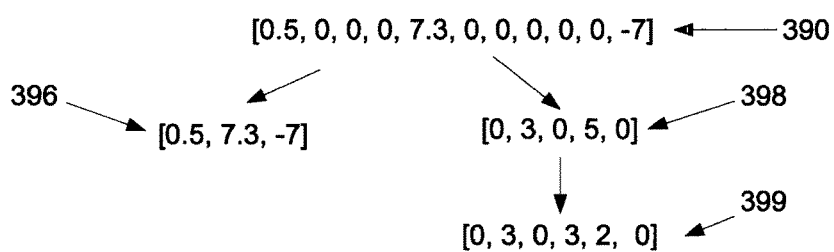
FIG. 9 shows a graphical representation illustrating a zeros elimination further compression step of the method of FIG. 7.
Figure 7:
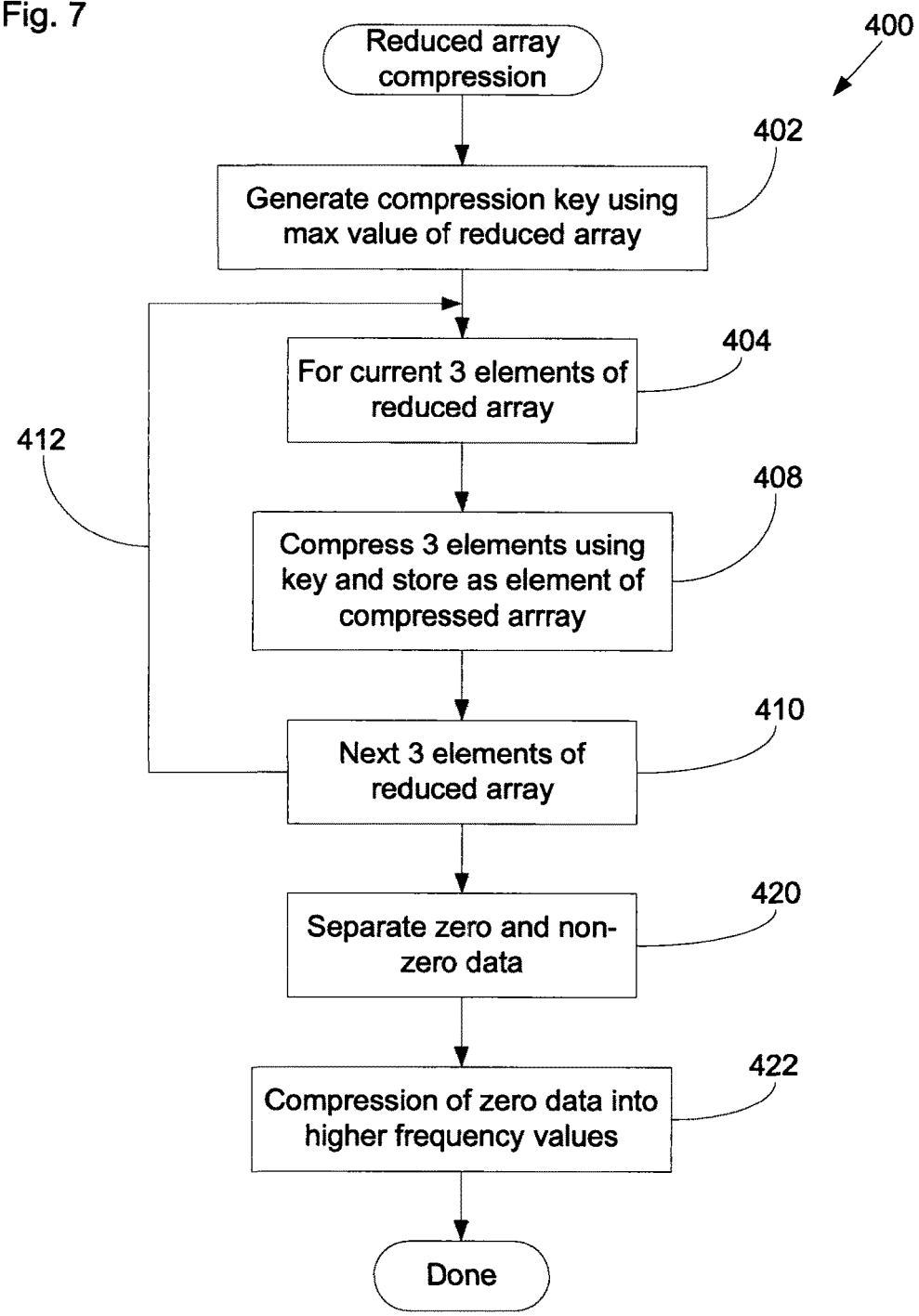
FIG. 7 shows a process flow chart illustrating an array compression method used in the algorithm illustrated by FIG. 5.

The reduced AC array compression stage 368 of the MMS method 350 is illustrated by the process flow chart of FIG. 7 and graphically by FIGS. 8 and 9. The reduced AC array compression method 400 includes a first stage, in which a key is used to compress the data by a third and a second optional stage in which the compressed data can be further compressed by separating out the non-zero and zero data values.

The first compression stage starts at 402 by generating a compression key using a maximum value of the data in the reduced AC array 380. The compression key, Key, used in this example has three components: Key [1], Key [2] and Key[3]. Each reduced AC array will give rise to its own key values, as the key values depend on the maximum value in the reduced AC array. The principle of the key is similar to the weights used in Perceptron Neural Network: $P=AW_1+BW_2+CW_3$, where $W_1$ are weight values which are generated randomly and "A," "B" and "C" are data. The output of this summation is "P" and there is only one possible combination for the data values for the given $W_1$ At 402 a key generator method is used to generate the key values. The maximum value of the data elements in the reduced AC array 380 is selected, and the three key components are generated according to following steps:

M=MAX_VALUE+(MAX_VALUE/2); %% maximum value selected and divided by "2"
Key[1]=0.1; %% First Key value <=1
Key[2]=(0.1×M)×Factor; %% Factor=1, 2, 3 . . . etc.
Key[3]=(KEY(1)×M+KEY(2)×M)×Factor;
KEY=[Key[1], Key[2], Key[3]];

and which are the final key values used in the compression and decompression methods At 404, the first three data elements 382, 384, 286 of the reduced AC array 380 are selected and the combined into a single value according to the following equation:

CodedArr(*P*)=Key[1]*RA(*L*)+Key[2]*RA(*L*+1)+Key[3]*RA(*L*+2)

where "RA" is represents reduced AC array data;
L=1, 2, 3, . . . N−3. "N" being the size of reduced AC array
P=1, 2, 3 . . . N/3, where "P" denoted the position within the coded AC array and which is stored as the first data element 392 of the coded AC array 390. At 408, the next three data elements, the $4^{th}$ to $6^{th}$, of the reduced AC array 380 are selected and processing returns 412 to step 404 and they are compressed using the same Key to generate the second data element 394 of the coded AC array 390. Processing continues to loop in this way until all of the reduced AC array has been compressed to generate the coded AC array 390 and which has one third the number of data elements.

In pseudo code the first compression stage 402-412 of the reduced AC array compression method 400 can be expressed as follows:

```
Let Pos=1
MAX_Value=Find_Max_value( Reduced AC Array);
W=Key-Generator (0.1, MAX_Value, 2);
I=1;
While (I< size of Reduced-Array)
    For K=0 to 2
    Coded AC Array[Pos]= Coded AC Array[Pos] +
    ( Reduced-Array[I+K] × W[K] );
    End; %% end for
    Pos++;
    I=I+3;
End; %% end while
```

The coded AC array will typically contain many zeros with a few nonzero data elements. All of the zeros can be erased and only the nonzero data can be kept. Hence, as second or further compression stage of the reduced AC array compression method 400 can optionally be used. This further compression method generally involves separating the zero data from the nonzero data. The zero data can be computed easily by calculating the number of zero data elements between two nonzero data elements.

For example, assume the following example coded AC array=[0.5,0,0,0,7.3,0,0,0,0,0,-7] as illustrated in FIG. 9. At step 420, the coded array 390 is separated into an array representing the zero data 398 and an array 386 including all the non-zero data=[0.5,7.3,-7]. The array representing the zero data, the zero-array, is=[0.3,0.5,0] where the 0's indicate the position of nonzero data at the corresponding positions in the coded AC array 390 and the finite numbers indicate the numbers of zeros between two consecutive non-zero data elements. In order to increase the compression ratio, at 422, the data in the zero-array can be converted into data values having a higher frequency of occurrence for further compression. For example, the number "5" in the zero-array 398 can be broken up into the number "3" and "2" to increase the probability of redundant data, for example as the number "3" now appears more frequently in array 399. Thus, the new equivalent zero-array 399 is [0,3,0,3,2,0].

The final step of the compression method 200 is arithmetic coding 270 for lossless compression of the DC array 330 and coded AC arrays 396, 399. Arithmetic coding is a generally known in data compression. Arithmetic coding takes a stream of data and converts it into a single floating point value. The output values are in the range of less than one and greater than zero and when the floating point value id decoded it returns the exact same stream of data. The arithmetic coding step 270 computes the probability of all data items in the stream of data to be encoded and assigns a value in the range zero to one for each data item in order to generate streams of compressed bits. The principles of arithmetic coding are described, for example, in Introduction to Data Compression, $2^{nd}$ Edition, Sayood., K., Academic Press. Hence, at 270 the compressed DC array 330 is arithmetically coded, the non-zero coded AC array 396 is arithmetically coded and the zero coded AC array 399 is arithmetically coded.

Figure 10:
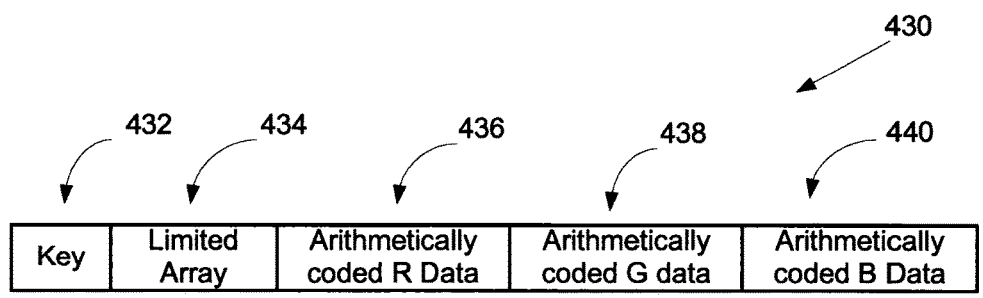
FIG. 10 shows a graphical representation of data structure for a compressed image data file.

The result of applying the compression method to the original image data is a compressed image file 430 having the file structure and data elements illustrated in FIG. 10. A header portion of the file 430 stores the Key 432 used during the reduced AC array compression and also the limited data array 434 generated at the start of the MMS method. A body portion of the compressed image file stores the arithmetically coded data for the red 436, blue 438 and green 440 components of the original pixel data. Obviously for other colour systems, the corresponding colour components will be used and for a grey scale image only a single field is used for the arithmetically coded grey scale value for the original pixel data. For a still image, e.g. a photograph, a single file 430 is provided. For video images, a single life is also used, but with the body included data for each consecutive frame of video image data. For 3D images the same compression method is used, because a 3D surface is effectively a 3D image that is converted to a 3D structure by a further process.

Figure 11:
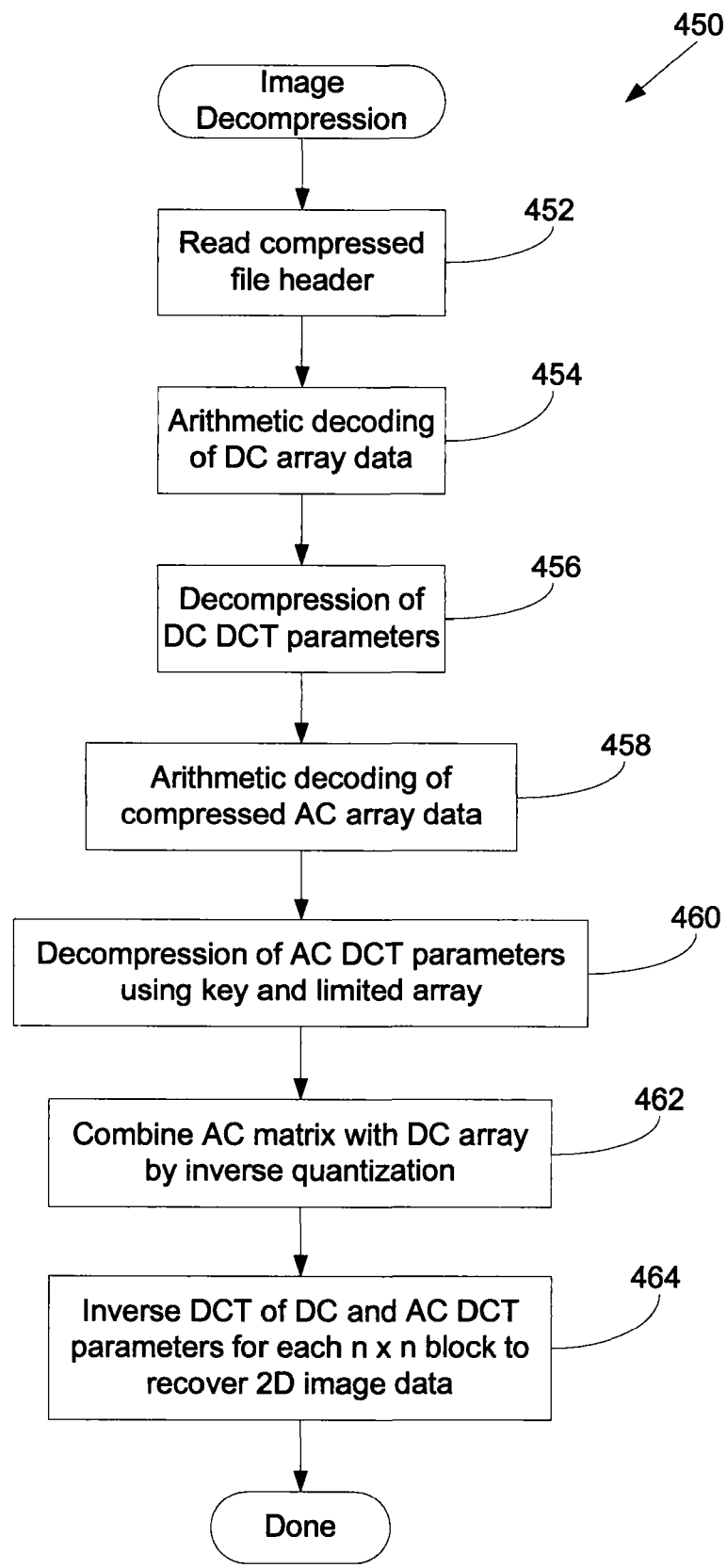
FIG. 11 shows a process flow chart illustrating an image decompression method according to the invention and corresponding to the image decompression step of FIG. 1.

FIG. 11 shows a process flow chart illustrating the decompression method 450 of the invention and corresponding generally to step 108 of FIG. 1. The decompression method 450 is generally speaking the inverse of the compression method 200 and consists of three main stages: decoding of the DC array; decoding of the reduced AC array; and reconstitution of the pixel data by applying inverse quantisation and an inverse DCT. At 452, the header portion of the compressed file 430 is read to obtain the Key and limited data array used during compression of the AC matrix and which are used to reconstitute the elements of the AC matrix.

Figure 12:
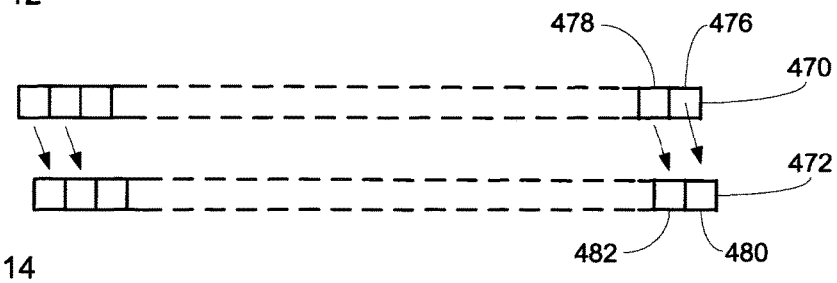
FIG. 12 shows a graphical representation of a DC DCT coefficient decompression step of FIG. 11.

The first stage of the decompression process proper occurs at 454 and the received arithmetically coded DC array is arithmetically. Then, at 456, the decoded DC array 470 is decompressed into an array of quantised DC DCT coefficients 472, as illustrated graphically in FIG. 12. The decompression method used at 456 is essentially the reverse of the DBV or Difference Between two Values process described above. An Addition Between two Values or ABV process is applied to the decoded DC array 470 at 456 to return the original quantised DC DCT coefficient values. ABV represents an inverse equation to DBV and is applied to adjacent pairs of values in the decoded DC array 470, e.g., 476, 478, takes the last value at position m, 476, and adds it to the previous value, 478 at position m−1 and stores the current total at the last position 480 of the DC array 472. Then the current total is added to the next previous value 480 at position m−2, and the result stored in the next to last position 482 of the DC array 472, and so on. The following equation defines the ABV decompression process:

$$D(i-1)=D(i-1)+D(i)$$

Where I=m, (m−1), (M−2), (M−3), . . . , 2 and m is the number of elements in the decoded DC array 470.

For example, using the same coded DC array as above, [0, −1, 1, 0, 1, −2, −1, 4, −1, 0, 14], the last ($m^{th}$) element in the decoded array is 14, the m-$2^{th}$ is 0+14=14, the m-$3^{th}$ element is −1+14=13, the m-$4^{th}$ element is 4+13=17, etc., and hence the original DC array is decoded. Hence, the result of step 456 is an array of quantised DC DCT coefficients.

The arithmetic decoding decompressed the zero AC array and nonzero array, and then combines the zero AC array with nonzero AC array to generate the coded AC array including zeros. For example the decompressed non zero AC array is=[0.5,7.3,−7] and the decompressed zero AC array is=[0,3,0,5,0] and so the resulting combination is the coded AC array being [0.5,0,0,0,7.3,0,0,0,0,−7].

Decoding of the reduced AC array at 460 uses a method which finds the original high frequency data values. The compressed data file 430 contains information about the compression keys used, k[1], k[2], k[3] 432 and data 434 about the probability of the individual data values and those individual data values, the limited array data, followed by streams of compressed DC DCT data 436, 438, 440. Therefore, the AC DCT data decompression method used at 460 picks up each k-compressed data element from the coded AC array to reconstruct the k×3 original AC DCT data elements of the reduced AC array. The method used at step 460 may be referred to as a Parallel-Fast Match Search method because it uses parallel processing streams each using a binary search algorithm.

Figure 14:
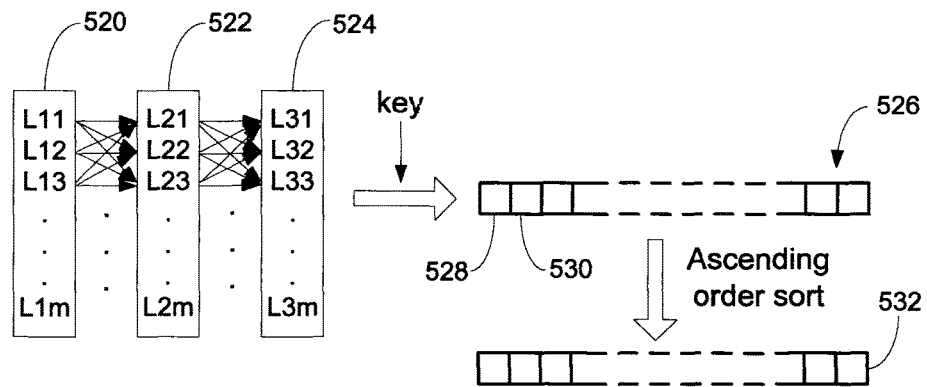
FIG. 14 shows a graphical representation of a first part of the method of FIG. 13 of decoding the AC DCT data.
Figure 16:
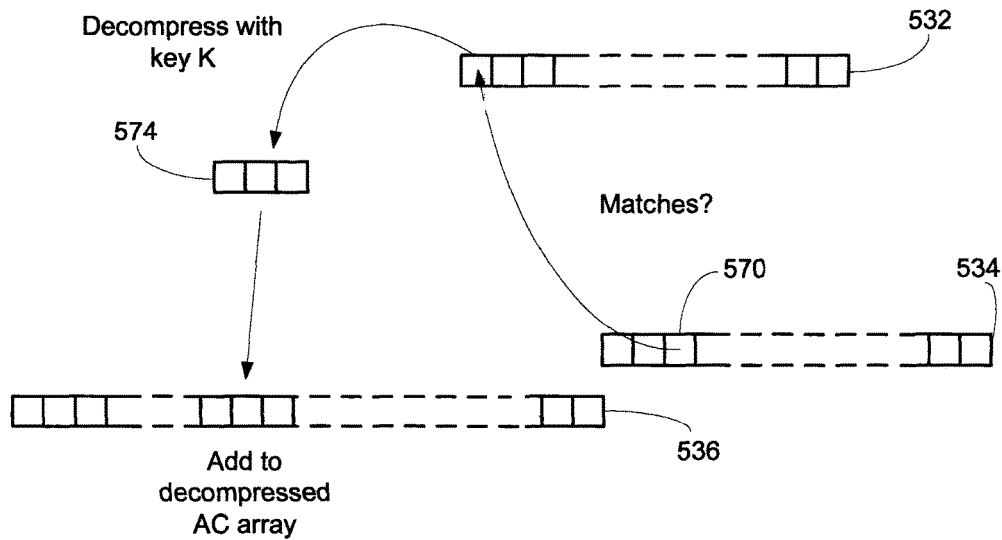
FIG. 16 shows a graphical representation of the method of FIG. 15 of decoding the AC DCT data.
Figure 13:
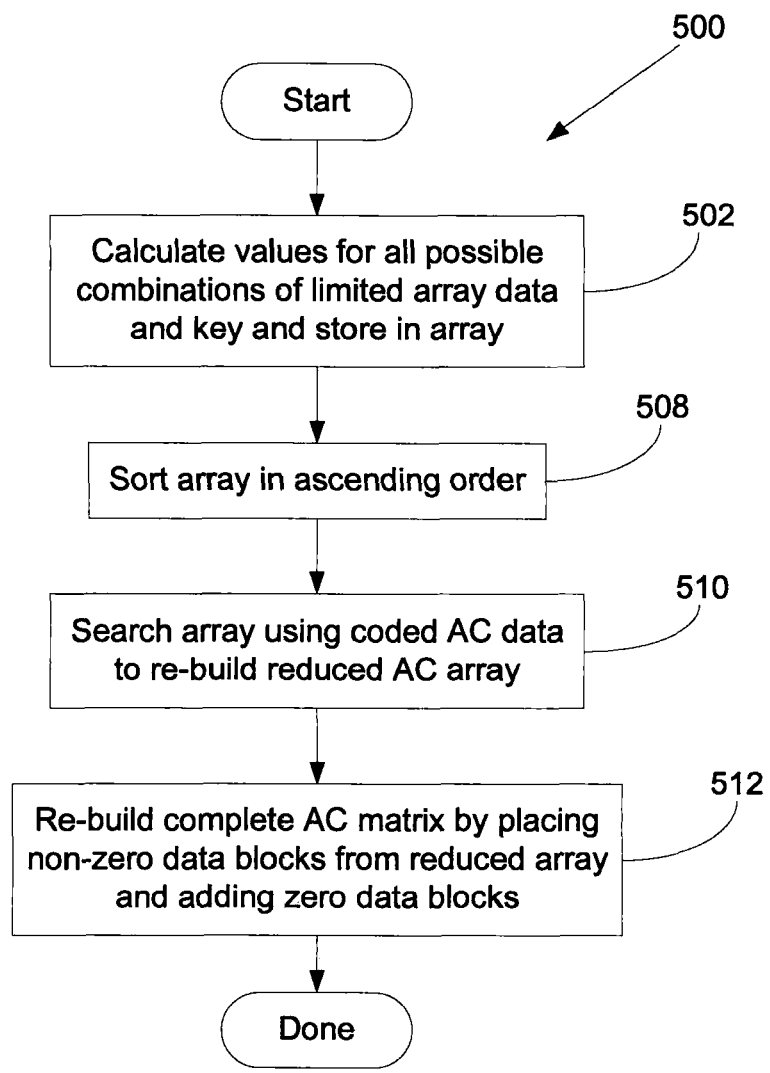
FIG. 13 shows a process flow chart illustrating an AC DCT coefficient decompression method and corresponding to an SC DCT coefficient decompression step of the method of FIG. 11.
Figure 15:
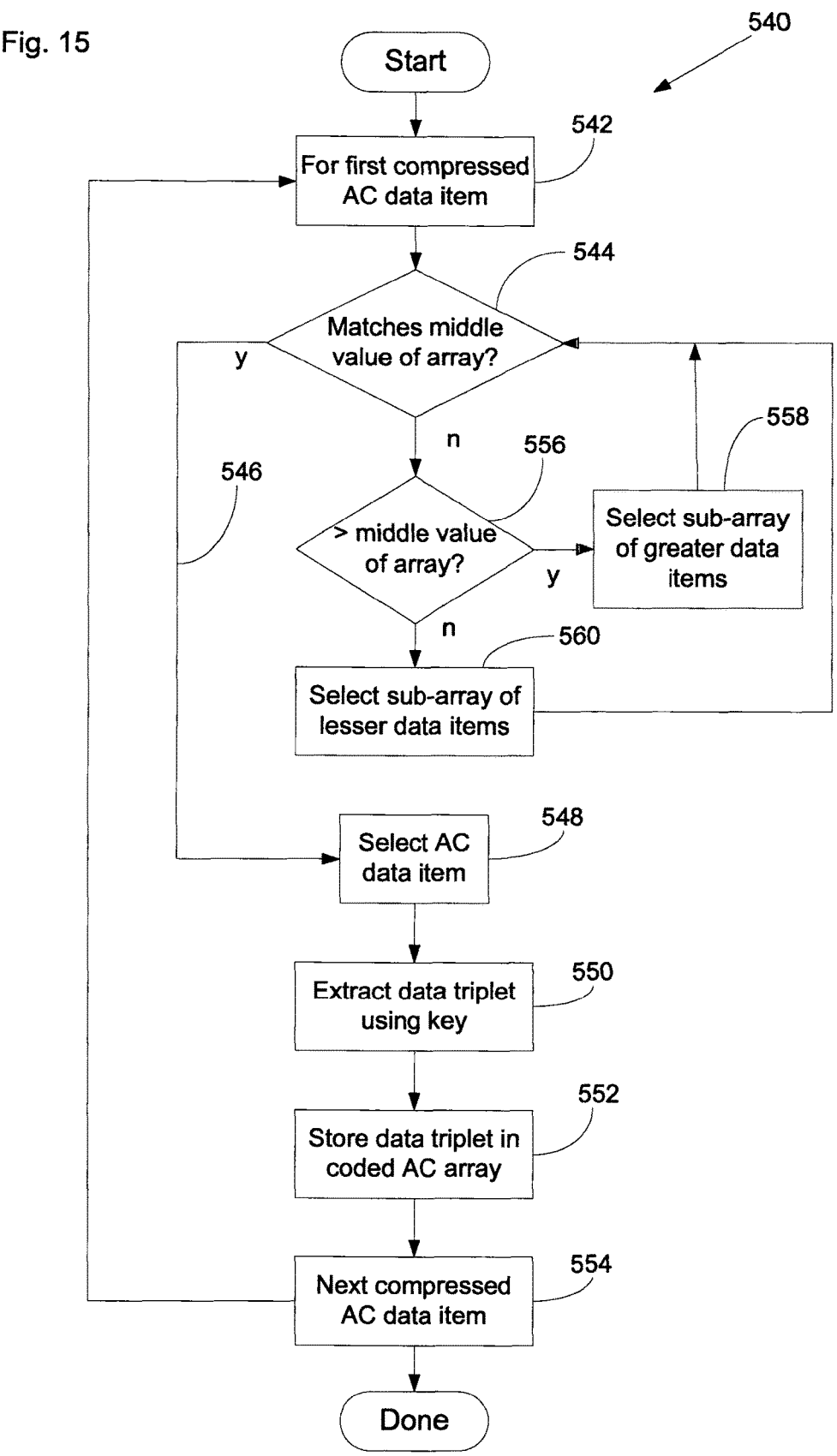
FIG. 15 shows a process flow chart illustrating an AC DCT data decoding method used in the method of FIG. 13.

The Parallel-FMS method is illustrated by the process flow charts of FIGS. 13 and 15 and graphically by FIGS. 14 and 16. FIG. 13 shows a process flow chart illustrating the coded AC array decompression method 500 used at step 460 to regenerate the AC DCT matrix. At 502, three arrays 520, 522, 524, of the limited data, i.e. the unique values of the data items appearing at least once in the reduced Ac array, are generated. In array 520, L11 represents the first data element of the first array, L12, represents the second data element of the first array, etc., up to L1$m$ which represents the last, $m^{th}$, data element of the first array. In array 522, L21 represents the first data element of the second array, L22, represents the second data element of the second array, etc., up to L2$m$ which represents the last, $m^{th}$, data element of the second array. In array 524, L31 represents the first data element of the third array, L32, represents the second data element of the third array, etc., up to L3$m$ which represents the last, $m^{th}$, data element of the third array.

Initially, the three arrays 520, 522, 524 of the limited data contain the same values, that is L11=L21=L31, L21=L22=L32, etc., and at 502 the method 500 computes all possible combinations of the elements of 520, with K[1], the elements of 522 with K[2] and the elements of 524 with K[3], and the result of each combination is stored as an element of limited data-key combinations array 526. For example, the first element 528 of 526 is given by L11*k[1]+L21*k[2]+L31*k[3], the second elements 530 of 526 is given by L11*k[1]+L21*k[2]+L32*k[3], etc. After all the possible combinations of the element of 520, 522 and 524 with the key have been calculated and store in array 526, array 526 is sorted in ascending order at step 508 to form the sorted limited data-key combinations array 532.

Then at 510 the sorted array 532 is searched using the element of the coded AC array 534 to reconstitute the reduced AC array. The search method used at step 510 implements the Binary search algorithm in a parallel form. In particular, step 510 uses l-binary search processes in parallel to reconstruct the l×3 original data elements used to re-build the reduced AC array 536 as illustrated in FIG. 16. FIG. 15 shows a process flow chart illustrating one thread of the binary search method 540, and 1 of these operate in parallel. Each of the l-binary search methods selects 542 a compressed AC data item from the coded AC array 534, e.g. data element 570, and compares the AC data element 570 with the middle or central element of the sorted limited data-key combinations array 532. It the values are determined to match at 544, then a matching element has been found and is selected at 548 and the corresponding triplet of data items 574 is extracted using the key, k, at 550, e.g. the triplet L15, L27, L34. The decompressed triplet of AC data items are then stored 552 at their corresponding position in the reduced AC array 536. For example, data element 570 is from the third position in the coded AC array 534, and therefore is placed at the third position in the reduced AC array 536. A next coded AC array data item is selected 554 and processing loops.

Otherwise, if at 544 it is determined that the data element 570 is greater than the middle element of array 532, then the method selects 558 the half of the array having greater data values and step 544 repeats its actin on the sub-array to the right of the middle element. Alternatively, if the value is determined not to be greater at 556, then at 560 the method selects the half of the array having lesser data values and step 544 repeats its action on the sub-array to the left of the middle element. Hence, steps 544, 556, 558 and 560 loop to repeatedly halve the array 532 until a matching data value is found. Hence, the result of method 540 is to re-build the reduces Ac array 536 and decompress the coded AC array 534 by a factor of three for the three component key used in this example.

Figure 17:
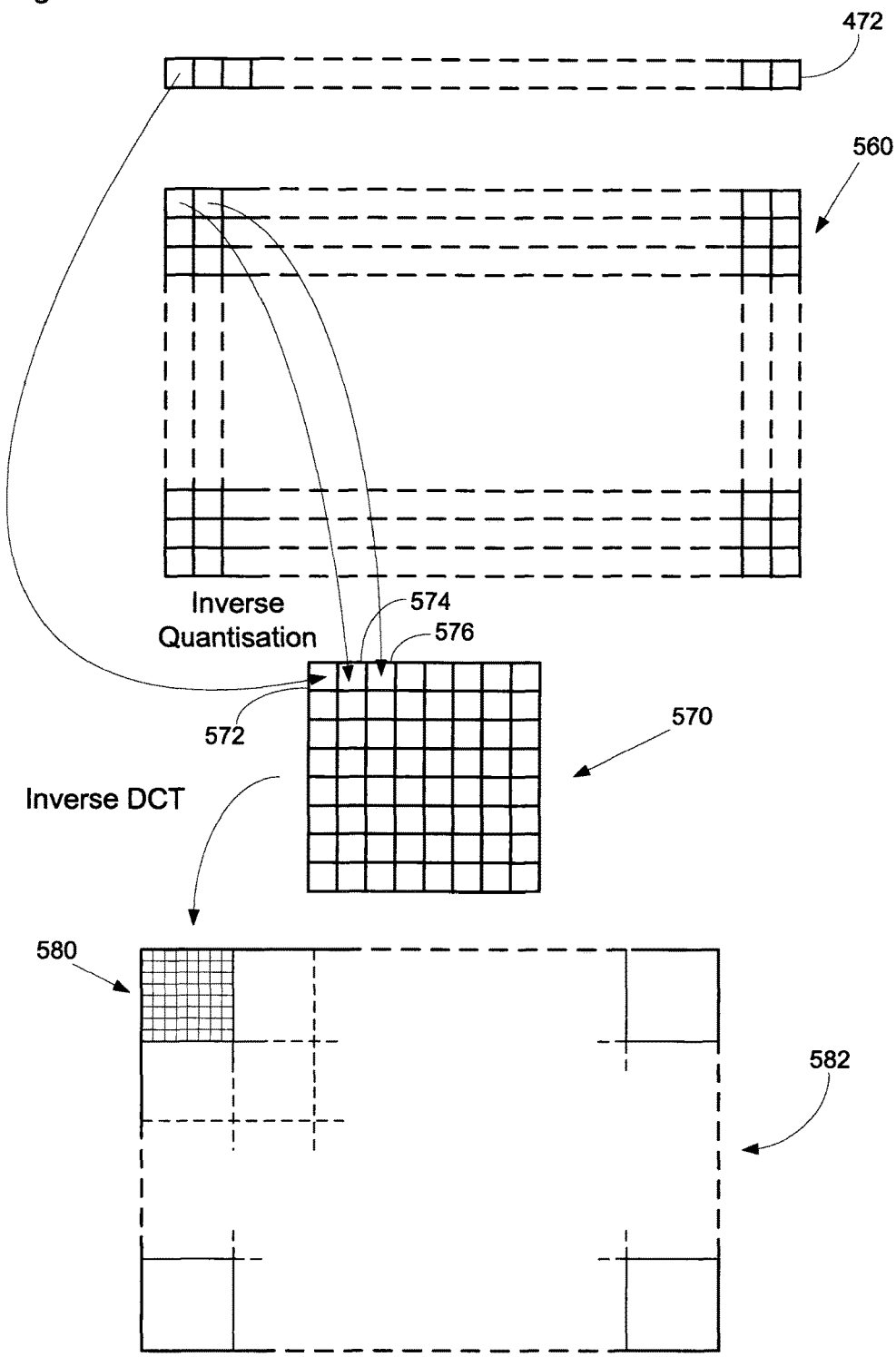
FIG. 17 shows a graphical representation of the inverse quantisation and inverse DCT portions of the decompression method of FIG. 11.

Then at 512, the complete Ac matrix is re-built using the reverse of the EZSN method. The reduced AC array 536 stores all the data for all of the nonzero data blocks of the AC matrix. Hence, the 8×8 blocks of non-zero data are replaced in their corresponding positions in the Ac matrix 560 as shown in FIG. 17 and the remaining 8×8 blocks all have zero data values, as they were originally eliminated on that bases. The positions (i, j) for nonzero-blocks are stored in an array called LOC generated during the AC matrix compression method which eliminates zero blocks and stores non-zero blocks and that contain information about the location of each non-zero block. The LOC array can be represented in a few bytes and is saved in the header file and its effects on file size are negligible. Hence, at the end of method 500, the AC matrix 340 has been rebuilt as AC matrix 560.

Returning to FIG. 11 and with further reference to FIG. 17, at 462 the elements of the AC matrix 560 are combined with the elements of the DC array 472 followed by inverse quantisation (dot-multiplication with Eq. (2) above), to recover 8×8 matrix DCT coefficients 570, including the DC DCT coefficient 572 and the SC DCT coefficients, e.g. 574, 576, for each of the 8×8 pixel blocks. Finally, at 464, the inverse DCT is applied to the matrix DCT coefficients 570 using Equation (6) below, to recover the pixel data for the corresponding 8×8 pixel block 580 of the image 582. This is carried out for each colour channel of a pixel block and for each pixel block of the image 582 so as to recover all the pixel colour data for the entire image 582.

$$f(x, y) = \sum_{u=0}^{Block-1} \sum_{y=0}^{Block-1} a(u)a(v)C(u,v)\cos\left[\frac{(2X+1)u\pi}{2Block}\right]\cos\left[\frac{(2y+1)v\pi}{2Block}\right] \quad (6)$$

A noted above the compression and decompression method can handle 2D images used in 3D image applications. The principle of operation of 3D surface scanning is to project patterns of light onto the target surface whose image is recorded by a camera. The shape of the captured pattern is combined with the spatial relationship between the light source and the camera, to determine the 3D position of the surface along the pattern. The main advantages of the method are speed and accuracy, a surface can be scanned from a single 2D image and processed into 3D surface in a few milliseconds.

The following table compares the compression and decompression method of the invention with JPEG and JPEG2000 for five different 2d images. The quality of the decompressed image is reflected in the root means square error (RMSE) values listed in the table.

| Image Name | Block size used by DCT | Original image size | Compressed image size | Invention 2D RMSE | JPEG 2D RMSE | JPEG2000 2D RMSE |
|---|---|---|---|---|---|---|
| X-ray | 8 × 8 | 588 Kbytes | 10 Kbytes | 5.0 | 11.88 | 3.2 |
| Eye | 64 × 64 | 9 Mbytes | 14.2 Kbytes | 4.89 | 15.3 | 4.1 |
| Girl | 16 × 16 | 2.25 Mbytes | 21.2 Kbytes | 10.48 | 21.1 | 6.4 |
| Cell | 64 × 64 | 8.5 Mbytes | 9.8 Kbytes | 4.2 | 16 | 2.5 |
| Baby | 32 × 32 | 3 Mbytes | 18.3 Kbytes | 5.3 | 15.5 | 3.5 |

As can be seen, for the same compression ratio, the invention has a superior RMSE to that of JPEG and a comparable RMSE to JPEG2000. However, the invention can also be used to compress both still images and video without introducing blurring unlike if JPEG2000.

Figure 18A:
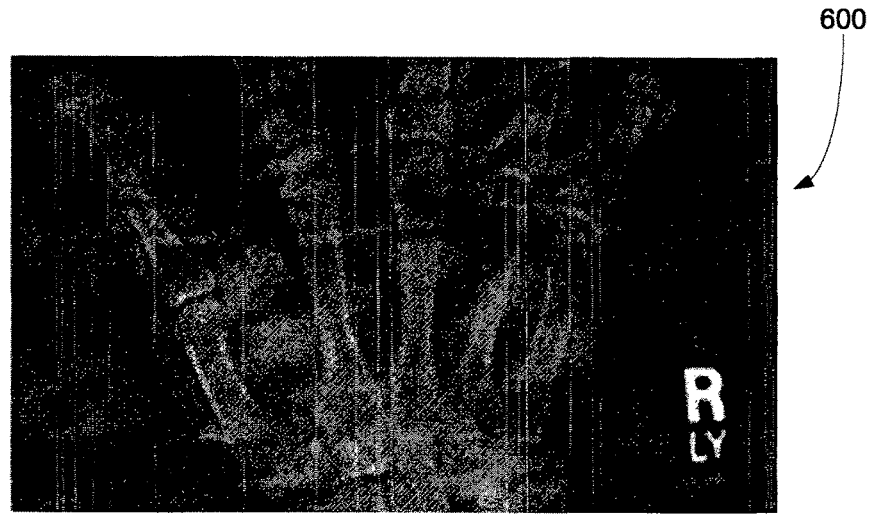
FIG. 18A shows an example of the result of applying the method of the invention to compressing and decompressing an X-ray image file.
Figure 18B:
FIG. 18B shows an example of the result of applying the JPEG algorithm to compress and decompress the same X-ray image file as that used for FIG. 18A to the same size.
Figure 18C:
FIG. 18C shows an example of the result of applying the JPEG2000 algorithm to compress and decompress the same X-ray image file as that used for FIG. 18A to the same size.

FIGS. 18A to 18C visually shows the results of the first line of the above table comparing the invention with JPEG and JPEG2000. FIG. 18A shows the image 600 resulting from compressing an X-ray image from 588 Kbytes to 10 Kbytes using the method of the invention and then decompressing using the method of this invention. FIG. 18B shows the image 602 resulting from compressing an X-ray image from 588 Kbytes to 10 Kbytes and then decompressing using JPEG. FIG. 18C shows the image 604 resulting from compressing an X-ray image from 588 Kbytes to 10 Kbytes and then decompressing using JPEG2000. As can be seen, for the same compression ratio, the JPEG image 602 includes compression artefacts, not visible in image 600. Also, image 600 generated using the methods of the invention is visually indistinguishable from image 604 generated using JPEG.

The methods of the invention realise high quality image compression for 2D images and 3D image reconstruction. The methods are based on DCT is connection with separating out the DC DCT coefficients and minimising the size of the matrix of AC DCT coefficients. The methods of the invention can produce bettor image quality at higher compression ratios than JPEG and JPEG2000 can is capable of accurate 3D reconstructing at higher compression ratios. Also the reconstructed 2D images at higher compression rations are visually equivalent with JPEG2000 and better than the JPEG algorithm.

A number of features of the methods of the invention are noteworthy. The DCT is applied using a large pixel block size, of at least 4, but preferably ≥8. The final transformed image is separated into DC DCT coefficient values and AC DCT coefficient values using different matrices. The DC DCT coefficients can be represents using only a few bytes, as all of the values are highly frequent.

Since the quantised AC DCT coefficient matrix contains many zeros, as approach is used to reduce the amount of data to be compressed by eliminating zeros and keeping non-zero data. This approach keeps the most significant information while reducing the matrix size by up to 75% or more.

The non-zero data is further compressed, by a factor of three, into a single floating-point value. This process converts the AC matrix into a one-dimensional array, with an increased compression ratio while keeping the quality of the AC coefficients.

For decompression, an efficient and fast search algorithm is used to finding the exact original data from a one-dimensional array, i.e. the coded AC array, which is then converted back into the AC Matrix, and which uses the key-values and limited data.

The key-values and limited data are used in compressing and decompressing an image. Without these, images cannot be reconstructed. Hence, these elements can also be used to provide encryption, security or digital rights management, by preventing unauthorised decompression of the image data.

The compression method when used on true colour images (i.e. Red, Green end Blue), obtains higher compression ratios and high image quality for 3D images containing green striped lines. Additionally, the method can be used on YCbCr images with good quality at higher compression ratios for 2D and 3D images.

The methods of the invention are particularly suited to real-time applications such as 3D data objects and video data streaming over computer networks, such as the Internet.

Generally, embodiments of the present invention, and in particular the processes involved in the compression and decompression of image data employ various processes involving data processed by, sorted in or transferred through one or more computer systems. Embodiments of the present invention also relate to one or more data processing apparatus for performing these operations. The or each apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will appear from the description given below.

In addition, embodiments of the present invention relate to computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks, magneto-optical media; semiconductor memory devices, and hardware devices that are specially configured to store and perform program instructions, such as read-only memory devices (ROM) and random access memory (RAM). Examples of program instructions include both machine code, such as produced by a complier, and files containing higher level code that may be executed by the computer using an interpreter.

Figure 19:
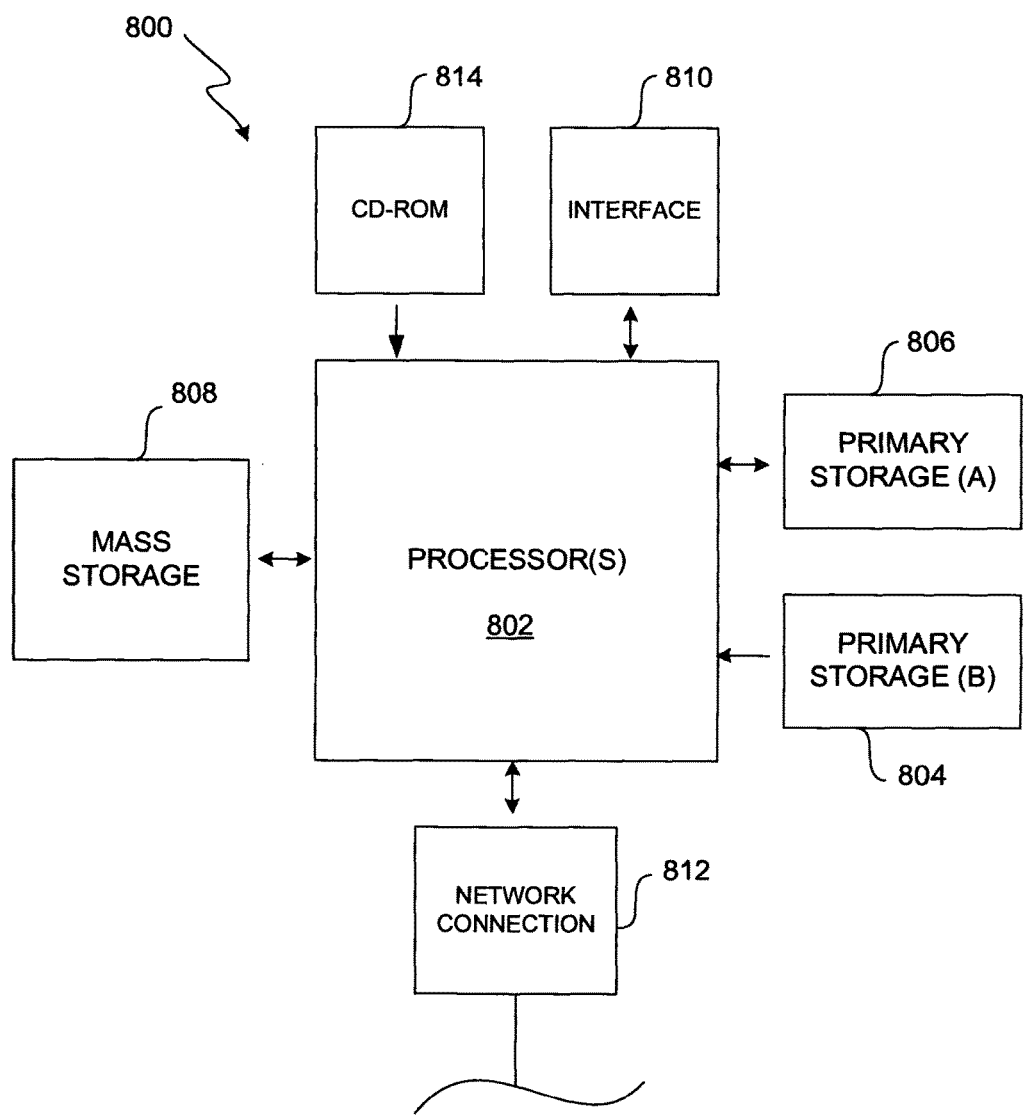
FIG. 19 shows a schematic block diagram of a data processing device according to the invention configured to out the compression and/or decompression methods of the invention.

FIG. 19 illustrates a typical computer system that, when appropriately configured or designed, can serve as a data processing apparatus of this invention. The computer system 800 includes any number of processors 802 (also referred to as central processing units, or CPUs) that are coupled to storage devices including primary storage 806 (typically a random access memory, or RAM), primary storage 804

(typically a read only memory, or ROM). CPU 802 may be of various types including microcontrollers and microprocessors such as programmable devices (e.g., CPLDs and FPGAs) and programmable devices such as gate array ASICs or general purpose microprocessors. As is well known in the art, primary storage 804 acts to transfer data and instructions uni-directionally to the CPU and primary storage 806 is used typically to transfer data and instructions in a bi-directional manner. Both of those primary storage devices may include any suitable computer-readable media such as those described above. A mass storage device 808 is also coupled bidirectionally to CPU 802 and provides additional data storage capacity and may include any of the computer-readable media described above. Mass storage device may be used to store programs, data and the like and is typically a secondary storage medium such as a hard disk. It will be appreciated that the information retained within the mass storage device 808, may, in appropriate cases, be incorporated in standard fashion as part of primary storage 806 as virtual memory. A specific mass storage device such as a CD-ROM 814 may also pass data uni-directionally to the CPU.

CPU 802 also coupled to an interface 810 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to an external device such as a database or a computer or telecommunications network using an external connection as shown generally at 812. With such a connections, it is contemplated that the CPU might receive information from the network, or might output information to the network in the course of performing the method steps described herein.

Although the above has generally described the present invention according to specific processes and apparatus, the present invention has a much broader range of applicability. In particular, aspects of the present invention is not limited to any particular kind of image data. One of ordinary skill in the art would recognize other variants, modifications and alternatives in light of the foregoing discussion.

The invention claimed is:

1. A data processing device comprising at least one data processor and a non-transitory computer readable medium coupled to the at least one data processor, the non-transitory computer readable medium storing instructions that when executed by the at least one data processor cause the at least one data processor to perform a process comprising:
    applying a discrete cosine (DCT) transformation to each of a plurality of non-overlapping pixel blocks which span a frame of image data to generate a set of DCT coefficients for each pixel block comprising a DC DCT coefficient and a plurality of AC DCT coefficients;
    quantising each set of DCT coefficients to generate a set of quantised DC DCT coefficients and a set of quantised AC DCT coefficients;
        forming a DC array from the set of quantised DC DCT coefficients;
        forming an AC matrix from the set of quantised AC DCT coefficients;
    forming a limited data array comprising elements having values corresponding only to each unique value of the elements of the AC matrix;
    compressing the AC matrix by eliminating blocks of data of the AC matrix having only zero values and forming a reduced AC array from blocks of data of the AC matrix including non-zero values;
    storing a position in the AC matrix of each block of data of the AC matrix including non-zero values in a location array;
    generating a key using a maximum value of the elements of the reduced AC array, and wherein the key comprises a plurality of key components;
    compressing the reduced AC array using the key to form a coded AC array, wherein a same number of elements of the reduced AC array as a number of key components are combined using the key to form a single element of the coded AC array;
    arithmetically coding the DC array and the coded AC array to form arithmetically coded data; and
    forming a compressed image file including the arithmetically coded data, storing the location array in a header of the compressed image file and storing the key and the limited data array.

2. The data processing device of claim 1, wherein quantising each set of DCT coefficients includes dividing the DCT coefficients of each set of DCT coefficients by a quantisation factor which is greater than two.

3. The data processing device of claim 1, and wherein the process further comprises compressing the DC array to form a compressed DC array and wherein the compressed DC array is subsequently arithmetically coded to form the arithmetically coded data.

4. The data processing device of claim 3, wherein compressing the DC array includes calculating differences between values of the elements of the DC array and wherein said differences form the compressed DC array.

5. The data processing device of claim 1, wherein compressing the reduced AC array further comprises forming a first coded AC array including the non-zero values of the coded AC array and forming a second coded AC array including data which encodes the zero values of the coded AC array.

6. The data processing device of claim 1, wherein the key and/or the limited data array are stored in a header of the compressed image file.

7. The data processing device of claim 1, wherein each of the plurality of non-overlapping pixel blocks has a size of n×n and wherein n is at least 4.

8. The data processing device of claim 1, and wherein the process further comprises storing the compressed image file locally on a first data processing device and/or transmitting the compressed image file to a communications network for storage on a remote second data processing device.

9. A data processing device comprising at least one data processor and a non-transitory computer readable medium coupled to the at least one data processor, the non-transitory computer readable medium storing instructions that when executed by the at least one data processor cause the at least one data processor to perform a process comprising:
    opening a compressed image file including arithmetically coded data, wherein a header of the compressed image file includes a location array;
    arithmetically decoding the arithmetically coded data to form a DC array and a coded AC array, and wherein elements of the DC array correspond to a set of quantised DC DCT coefficients;
    retrieving a key and a limited data array, wherein the key comprises a plurality of components and was generated using a maximum value of an original AC matrix;
    decompressing the coded AC array using the key and the limited data array to form a reduced AC array, wherein the limited data array comprises elements having values corresponding only to each unique value of the original AC matrix of quantised AC DCT coefficients prior to compression;

rebuilding an AC matrix using the location array which stores a position in the original AC matrix of each block of data of the original AC matrix including non-zero values by forming blocks of data in the AC matrix including non-zero values and obtained from the reduced AC array and forming a rest of the AC matrix with blocks of data having only zero values, and wherein the elements of the AC matrix are a set of quantised AC DCT coefficients;

applying an inverse quantisation to the set of quantised DC DCT coefficients and the set of quantised AC DCT coefficients to generate a plurality of sets of DCT coefficients each corresponding to a respective one of a plurality of pixel blocks, each set of DCT coefficients comprising a DC DCT coefficient and a plurality of AC DCT coefficients; and applying an inverse DCT transformation to each of the plurality of sets of DCT coefficients to form a plurality of non-overlapping pixel blocks which span a frame of image data.

10. The data processing device of claim 9, and wherein the process further comprises decompressing the DC array to form a further DC array in which the elements are the set of quantised DC DCT coefficients.

11. The data processing device of claim 10, wherein decompressing the DC array includes calculating a total between values of the elements of the DC array and storing results in the further DC array.

12. The data processing device of claim 9, wherein decompressing the coded AC array includes:
calculating the values of all possible combinations of the elements of the limited data array when combined with the key and storing them in an limited data-key combinations array;
applying a searching method to the limited data-key combinations array using the values of the elements of the coded AC array to find matching values; and
determining a combination of elements of the limited array corresponding to each matching value; and
forming the reduced AC array from each determined combination of elements of the limited array.

13. The data processing device of claim 12, further comprising sorting the limited data-key combinations array by size order to form a sorted limited data-key combinations array.

14. The data processing device of claim 12, wherein the search method implements a parallel binary search algorithm.

15. The data processing device of claim 9, wherein the compressed image file includes the key and/or the limited data array in a header of the compressed image file.

16. The data processing device of claim 9, wherein each of the plurality of non-overlapping pixel blocks has a size of n×n and wherein n is at least 4.

17. The data processing device of claim 9 wherein the process further comprises retrieving the compressed image file from local storage on said data processing device or receiving the compressed image file over a communications network from a remote data processing device.

18. The data processing device of claim 1, wherein the frame of image data is a 2D image.

19. The data processing device of claim 1, wherein the frame of image data is a 2D image including structured patterns and the compressed image file has ancillary data associated therewith enabling reconstruction and/or display of a corresponding 3D image.

20. The data processing device of claim 1, wherein the frame of image data is a still image or part of a video.

21. A system comprising:
a first data processing device comprising at least one first data processor and a first non-transitory computer readable medium coupled to the at least one first data processor, the first non-transitory computer readable medium storing first instructions that when executed by the at least one first data processor cause the at least one first data processor to:
apply a discrete cosine (DCT) transformation to each of a plurality of non-overlapping pixel blocks which span a frame of image data to generate a set of DCT coefficients for each pixel block comprising a DC DCT coefficient and a plurality of AC DCT coefficients;
quantise each set of DCT coefficients to generate a set of quantised DC DCT coefficients and a set of quantised AC DCT coefficients;
form a DC array from the set of quantised DC DCT coefficients;
form an AC matrix from the set of quantised AC DCT coefficients;
form a limited data array comprising elements having values corresponding only to each unique value of the elements of the AC matrix;
compress the AC matrix by eliminating blocks of data of the AC matrix having only zero values and forming a reduced AC array from blocks of data of the AC matrix including non-zero values;
store a position in the AC matrix of each block of data of the AC matrix including non-zero values in a location array;
generate a key using a maximum value of the elements of the reduced AC array, and wherein the key comprises a plurality of key components;
compress the reduced AC array using the key to form a coded AC array, wherein a same number of elements of the reduced AC array as a number of key components are combined using the key to form a single element of the coded AC array;
arithmetically code the DC array and the coded AC array to form arithmetically coded data; and
form a compressed image file including the arithmetically coded data;
store the location array in a header of the compressed image file and store the key and the limited data array; and
a second data processing device comprising at least one second data processor, wherein the second data processing device is remote from the first data processing device, and in communication with the first data processing device, and a second non-transitory computer readable medium coupled to the at least one second data processor, the second non-transitory computer readable medium storing instructions that when executed by the at least one second data processor cause the at least one second data processor to:
open a compressed image file including arithmetically coded data, wherein a header of the compressed image file includes a location array;
arithmetically decode the arithmetically coded data to form a DC array and a coded AC array, and wherein elements of the DC array correspond to a set of quantised DC DCT coefficients;

retrieving a key and a limited data array, wherein the key comprises a plurality of components and was generated using a maximum value of an original AC matrix;

decompress the coded AC array using the key and the limited data array to form a reduced AC array, wherein the limited data array comprises elements having values corresponding only to each unique value of the original AC matrix of quantised AC DCT coefficients prior to compression;

rebuild an AC matrix using the location array which stores a position in the original AC matrix of each block of data of the original AC matrix including non-zero values by forming blocks of data in the AC matrix including non-zero values and obtained from the reduced AC array and forming a rest of the AC matrix with blocks of data having only zero values, and wherein elements of the AC matrix are a set of quantised AC DCT coefficients;

apply an inverse quantisation to the set of quantised DC DCT coefficients and the set of quantised AC DCT coefficients to generate a plurality of sets of DCT coefficients each corresponding to a respective one of a plurality of pixel blocks, each set of DCT coefficients comprising a DC DCT coefficient and a plurality of AC DCT coefficients; and apply an inverse DCT transformation to each of the plurality of sets of DCT coefficients to form a plurality of non-overlapping pixel blocks which span a frame of image data.

22. The data processing device of claim 9 wherein the frame of image data is a 2D image.

23. The data processing device of claim 9, wherein the frame of image data is a 2D image including structured patterns and the compressed image file has ancillary data associated therewith enabling reconstruction and/or display of a corresponding 3D image.

24. The data processing device of claim 9, wherein the frame of image data is a still image or part of a video.

* * * * *

UNITED STATES PATENT AND TRADEMARK OFFICE
CERTIFICATE OF CORRECTION

PATENT NO. : 10,432,971 B2  
APPLICATION NO. : 15/553503  
DATED : October 1, 2019  
INVENTOR(S) : Mohammed Siddeq and Marcos Rodrigues Page 1 of 3

It is certified that error appears in the above-identified patent and that said Letters Patent is hereby corrected as shown below:

On the Title Page

Under (57) Abstract:
Line 6: After "of AC DCT" delete "coefficient." and replace with -- coefficients. --
Line 7: Delete "quantized." and replace with -- quantised. --
Line 7: After "the set of" delete "quantized" and replace with -- quantised --
Line 8: Delete "OCT" and replace with -- DCT --
Line 9: After "set of" delete "quantized" and replace with -- quantised --

In the Specification

Column 1, Line 43: Delete "toll" and replace with -- tool --
Column 1, Line 46: After "signal-to-noise" delete "ration" and replace with -- ratio --
Column 1, Line 47: Delete "values, its" and replace with -- values. Its --
Column 2, Line 7: Delete "structural" and replace with -- structured --
Column 2, Line 41: After "set of quantised" insert -- AC DCT coefficients. A DC array may be formed from the set of quantised --
Column 2, Line 41: After "DC DCT coefficients." insert -- An AC matrix may be formed from the set of quantised AC DCT coefficients. --
Column 2, Line 46: Delete "Dc" and replace with -- DC --
Column 2, Line 57: After "of the sets" insert -- of --
Column 2, Line 60: Delete "coefficient" and replace with -- coefficients --
Column 2, Line 63: Delete "coefficient" and replace with -- coefficients --
Column 3, Line 5: Delete "and or" and replace with -- and/or --
Column 3, Line 45: Delete "sorted" and replace with -- stored --
Column 4, Line 25: Delete "SC DCT" and replace with -- AC DCT --
Column 4, Line 51: Delete "my" and replace with -- may --
Column 4, Line 57: Delete "compose" and replace with -- comprise --
Column 4, Line 62: After "key and/or" insert -- a --
Column 5, Line 9: After "with it" insert -- or --

Signed and Sealed this  
Twenty-sixth Day of November, 2019

Andrei Iancu  
*Director of the United States Patent and Trademark Office*

CERTIFICATE OF CORRECTION (continued)
U.S. Pat. No. 10,432,971 B2

Column 5, Line 12: Delete "videos" and replace with -- video --
Column 5, Line 21: After "invention, and" insert -- any --
Column 5, Line 56: Delete "proceeding" and replace with -- processing --
Column 6, Line 6: Delete "drawing," and replace with -- drawings, --
Column 6, Line 20: Delete "SC DCT" and replace with -- AC DCT --
Column 6, Line 22: Delete "SC DCT" and replace with -- AC DCT --
Column 6, Line 43: Delete "SC DCT" and replace with -- AC DCT --
Column 7, Line 15: Delete "field." and replace with -- data. --
Column 7, Line 20: Delete "2001;" and replace with -- 2011; --
Column 7, Line 43: Delete "cameral" and replace with -- camera --
Column 8, Line 4: Delete "sorted" and replace with -- stored --
Column 8, Line 25: After "invention has" insert -- a --
Column 8, Line 44: Delete "presented" and replace with -- represented --
Column 8, Lines 49-50: After "the colour space used to represent" delete "by three colour data items, which will depend on the colour space used to represent"
Column 8, Line 55: Delete "illustrated" and replace with -- illustrates --
Column 8, Line 63: After "invention is that it" delete "used" and replace with -- uses --
Column 9, Line 11: Delete "1030×1020," and replace with -- 1030×1030, --
Column 9, Line 47: After "quantized by" delete "using a"
Column 9, Line 47: After ""Q" using" insert -- a --
Column 9, Line 56: Delete "i=9" and replace with -- i=8 --
Column 9, Line 62: After "array 320 is" insert -- the --
Column 10, Line 5: Delete "DC-array 330," and replace with -- DC-Array 330, --
Column 10, Line 19: Delete "{13," and replace with -- [13, --
Column 10, Line 19: Delete "14}" and replace with -- 14] --
Column 11, Line 12: After "[-1,0,5,1,2,-2]" insert -- and --
Column 11, Line 28: Delete "positional" and replace with -- positioned --
Column 11, Line 40: Delete "reduces" and replace with -- reduced --
Column 11, Line 50: After "data. The" insert -- process loops until the first row of data blocks have been evaluated and then at 366, the --
Column 12, Line 13: Delete "I=1 + K;" and replace with -- I=I + K; --
Column 12, Line 43: After "data values for" delete "the"
Column 12, Line 64: Delete "denoted" and replace with -- denotes --
Column 13, Line 21: Delete "1=I + 3;" and replace with -- I=I + 3; --
Column 13, Line 41: After "indicate the" delete "numbers" and replace with -- number --
Column 13, Line 46: Delete "number" and replace with -- numbers --
Column 13, Line 57: Delete "id" and replace with -- is --
Column 14, Line 14: Delete "life" and replace with -- file --
Column 14, Line 17: After "effectively a" delete "3D" and replace with -- 2D --
Column 14, Line 43: After "478," insert -- and --
Column 14, Line 55: After "-1, 1, 0, 1, -2, -1," insert -- -1, --
Column 14, Line 61: Delete "decompressed" and replace with -- decompresses --
Column 14, Line 62: After "and nonzero" insert -- AC --
Column 14, Line 67: Delete "[0.5,0,0,0,7.3,0,0,0,0,0,-7]." and replace with -- [0.5,0,0,0,7.3,0,0,0,0,0,-7]. --
Column 15, Line 7: After "compressed" delete "DC" and replace with -- AC --

CERTIFICATE OF CORRECTION (continued)
U.S. Pat. No. 10,432,971 B2

Column 15, Line 21: Delete "Ac" and replace with -- AC --
Column 15, Line 33: After "524 of" delete "the"
Column 15, Line 41: Delete "elements" and replace with -- element --
Column 15, Line 48: Delete "element" and replace with -- elements --
Column 15, Line 60: After "532." delete "It" and replace with -- If --
Column 16, Line 7: Delete "actin" and replace with -- action --
Column 16, Line 15: Delete "reduces Ac" and replace with -- reduced AC --
Column 16, Line 18: After "complete" delete "Ac" and replace with -- AC --
Column 16, Line 22: Before "matrix" delete "Ac" and replace with -- AC --
Column 16, Line 24: Delete "bases." and replace with -- basis. --
Column 16, Line 28: Delete "contain" and replace with -- contains --
Column 16, Line 37: After "matrix" insert -- of --
Column 16, Line 38: Delete "SC" and replace with -- AC --
Column 16, Line 40: After "matrix" insert -- of --
Column 17, Line 16: Delete "JPEG2000." and replace with -- JPEG200. --
Column 17, Line 18: After "unlike" delete "if"
Column 17, Line 24: Before "invention." delete "this" and replace with -- the --
Column 17, Line 40: Delete "bettor" and replace with -- better --
Column 17, Line 41: After "JPEG2000" delete "can" and replace with -- and --
Column 17, Line 44: Delete "rations" and replace with -- ratios --
Column 17, Line 49: After "separated into" insert -- the --
Column 17, Line 54: After "many zeros," delete "as" and replace with -- an --
Column 18, Line 19: After "Green" delete "end" and replace with -- and --
Column 18, Line 30: After "processed by," delete "sorted" and replace with -- stored --
Column 18, Line 58: Delete "complier," and replace with -- compiler, --
Column 19, Line 4: Delete "programmable" and replace with -- unprogrammable --
Column 19, Line 9: Delete "those" and replace with -- these --
Column 19, Line 15: After "device" insert -- 808 --
Column 19, Line 23: After "CPU 802" insert -- is --
Column 19, Line 32-33: After "With such a" delete "connections," and replace with -- connection, --